US011295147B1

(12) United States Patent
Milanese et al.

(10) Patent No.: US 11,295,147 B1
(45) Date of Patent: Apr. 5, 2022

(54) METHOD AND SYSTEM FOR DETECTING AND MANAGING OBFUSCATION OF A ROAD SIGN

(71) Applicant: HCL Technologies Italy S.p.A., Vimodrone (IT)

(72) Inventors: Nicola Milanese, Rome (IT); Francesco Lupini, Rome (IT); Alberto Lima, Rome (IT); Valeria Mazza, Rome (IT)

(73) Assignee: HCL Technologies Italy S.p.A., Milan (IT)

( * ) Notice: Subject to any disclaimer, the term of this patent is extended or adjusted under 35 U.S.C. 154(b) by 0 days.

(21) Appl. No.: 17/105,881

(22) Filed: Nov. 27, 2020

(51) Int. Cl.
*G06K 9/00* (2006.01)
*G06F 16/29* (2019.01)
*G06T 7/38* (2017.01)
*G06K 9/46* (2006.01)
(Continued)

(52) U.S. Cl.
CPC ......... *G06K 9/00818* (2013.01); *B60W 50/14* (2013.01); *G06F 16/29* (2019.01); *G06K 9/00657* (2013.01); *G06K 9/4604* (2013.01); *G06T 7/0004* (2013.01); *G06T 7/38* (2017.01);
(Continued)

(58) Field of Classification Search
None
See application file for complete search history.

(56) References Cited

U.S. PATENT DOCUMENTS

| 4,823,268 A | 4/1989 | Giles et al. |
| 5,585,626 A | 12/1996 | Beck et al. |
| 7,847,235 B2 | 12/2010 | Krupkin et al. |

(Continued)

FOREIGN PATENT DOCUMENTS

| CN | 103366552 A | 10/2013 |
| CN | 203688818 U | 7/2014 |

(Continued)

OTHER PUBLICATIONS

P. Huang, M. Cheng, Y. Chen, H. Luo, C. Wang and J. Li, "Traffic Sign Occlusion Detection Using Mobile Laser Scanning Point Clouds," in IEEE Transactions on Intelligent Transportation Systems, vol. 18, No. 9, pp. 2364-2376, Sep. 2017, doi: 10.1109/TITS.2016.2639582. (Year: 2017).*

(Continued)

*Primary Examiner* — Emily C Terrell
*Assistant Examiner* — Nathan J Bloom
(74) *Attorney, Agent, or Firm* — Kendal Sheets

(57) ABSTRACT

A method, a system and a computer program product for detecting and managing obfuscation of a road sign may be provided herein. The method may include receiving, a plurality of images from a plurality of vehicles over a time period, determining an extent of obfuscation of road sign in each of set of images. A current extent of obfuscation of the road sign is the extent of obfuscation of the road sign in most recent of the set of images. The method further includes performing a time-series analysis of extent of obfuscation of the road sign in each of set of images to determine rate at which the extent of obfuscation of road sign is increasing and determining an impending risk of failing to spot road sign, from an appropriate distance by vehicle. The method further includes providing a recommendation based on impending risk of failing to spot road sign.

20 Claims, 13 Drawing Sheets

(51) Int. Cl.
*B60W 50/14* (2020.01)
*G06T 7/00* (2017.01)

(52) U.S. Cl.
CPC ............... *G06T 2207/10016* (2013.01); *G06T 2207/30256* (2013.01)

(56) References Cited

U.S. PATENT DOCUMENTS

| | | | |
|---|---|---|---|
| 8,064,643 | B2 | 11/2011 | Stein et al. |
| 8,315,456 | B2 | 11/2012 | Hicks |
| 8,352,410 | B2 | 1/2013 | Rousselle et al. |
| 8,553,088 | B2 | 10/2013 | Stein et al. |
| 2009/0189373 | A1* | 7/2009 | Schramm ............ B60R 11/0264 280/731 |
| 2017/0103275 | A1* | 4/2017 | Yamanoi ................ G01C 21/26 |
| 2017/0193312 | A1* | 7/2017 | Ai ............................ G06F 13/20 |
| 2020/0126406 | A1* | 4/2020 | Ma ................... G08G 1/096725 |
| 2020/0225669 | A1* | 7/2020 | Silva ..................... G05D 1/0238 |
| 2020/0320676 | A1* | 10/2020 | Hardy ....................... B60R 1/00 |
| 2020/0324787 | A1* | 10/2020 | Wang ..................... B60K 35/00 |
| 2021/0150694 | A1* | 5/2021 | Pohl .......................... G06N 3/08 |

FOREIGN PATENT DOCUMENTS

| | | |
|---|---|---|
| CN | 104517449 A | 4/2015 |
| CN | 106203335 B | 5/2019 |
| FR | 2626081 A1 | 7/1989 |
| GB | 2548718 B | 9/2019 |
| JP | 2006252264 A | 9/2006 |

OTHER PUBLICATIONS

Ribeiro AM, Capitao SD, Correia RG. Deciding on maintenance of small municipal roads based on GIS simplified procedures. Case Studies on Transport Policy. Jun. 1, 2019;7(2):330-7. (Year: 2019).*

A. Gonzalez et al., "Automatic Traffic Signs and Panels Inspection System Using Computer Vision," in IEEE Transactions on Intelligent Transportation Systems, vol. 12, No. 2, pp. 485-499, Jun. 2011, doi: 10.1109/TITS.2010.2098029. (Year: 2011).*

Safat B. Wali, "Vision-Based Traffic Sign Detection and Recognition Systems: Current Trends and Challenges".

Bahman Soheilian, "Detection and 3D reconstruction of traffic signs from multiple view color images".

Shauna Hallmark, "Preparing Local Agencies for the Future of Connected and Autonomous Vehicles".

Funding for innovative tree growth & monitoring system, "https://foresttech.events/funding-for-innovative-tree-growth-monitoring-system/".

Quazi Marufur Rahman, "Did You Miss the Sign? A False Negative Alarm System for Traffic Sign Detectors".

Safat B. Wali, "An Automatic Traffic Sign Detection and Recognition System Based on Colour Segmentation, Shape Matching, and SVM".

Kwangyong Lim, "Real-time traffic sign recognition based on a general purpose GPU and deep-learning".

* cited by examiner

METHOD AND SYSTEM FOR DETECTING AND MANAGING OBFUSCATION OF A ROAD SIGN

TECHNICAL FIELD

One or more embodiments of the disclosure generally relate to maintenance of road signage. More particularly, certain embodiments of the disclosure relate to detecting and managing obfuscation of the road signage.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the invention, or any embodiments thereof, to anything stated or implied therein or inferred thereupon.

Various road signs are provided along edges of urban, suburban, and rural areas to ensure safe driving conditions for drivers. Signs may be provided to alleviate risky road conditions or to provide information for drivers. However, presence of vegetation may be frequent found along the edges of urban, suburban and rural roads. The vegetation may include a variety of plants and trees, both, growing wild and planted for decoration and to reduce air pollution levels. However, it may be impossible to regularly forecast and monitor the growth of the vegetation in order to trim the plants on a timely basis. The growth of the plants and branches of the trees may result in obfuscation of road signs and traffic light, thereby causing problems to traffic and leading to accidents. In certain scenarios, the detection of traffic signals or road signage hidden by plants on the road or other such obstructions may be important for safety of persons in vehicles and on the road. As a result, such scenarios may pose danger for unaware drivers.

Accordingly, there is a need to monitor and manage such obfuscation of road signage.

SUMMARY

A method, a system and a computer program product are provided in accordance with an embodiment for detecting and managing obfuscation of a road sign. In an example embodiment, a method is provided that includes: receiving, by a road sign maintenance device, a plurality of images from a plurality of vehicles over a period of time, wherein each of the plurality of images is captured by an image capturing device mounted on a vehicle from among the plurality of vehicle and is associated with a corresponding geographic location of the vehicle, and wherein a set of images from the plurality of images comprises a road sign in a geographic location that is at least partially obfuscated; determining, by the road sign maintenance device, an extent of obfuscation of the road sign in each of the set of images, wherein a current extent of obfuscation of the road sign is the extent of obfuscation of the road sign in most recent of the set of images; performing, by the road sign maintenance device, a time-series analysis of the extent of obfuscation of the road sign in each of the set of images to determine a rate at which the extent of obfuscation of the road sign is increasing; determining, by the road sign maintenance device, an impending risk of failing to spot the road sign, from an appropriate distance by the vehicle, based on the at least one of the current extent of obfuscation of the road sign and the rate at which the extent of obfuscation of the road sign is increasing; and providing, by the road sign maintenance device, a recommendation based on the impending risk of failing to spot the road sign.

According to some embodiments, the method further comprises processing, by the road sign maintenance device, each of the plurality of images to detect and identify the road sign at the geographic location, wherein the processing comprises at least one of performing image processing and applying an artificial intelligence model; sorting, by the road sign maintenance device, the set of the plurality of images based on the road sign at the geographic location. The method may further include computing, by the road sign maintenance device, a reliability score for the detection and identification of the road sign, wherein the recommendation is based on the reliability score.

According to some embodiments, the method further comprises determining the impending risk of failing to spot the road sign further comprises one of: determining, by the road sign maintenance device, whether the current extent of obfuscation of the road sign is more than a pre-determined threshold; and forecasting, by the road sign maintenance device, a time when the current extent of obfuscation of the road sign is more than the pre-determined threshold based on the rate at which the extent of obfuscation of the road sign is increasing.

According to some embodiments, the method further comprises determining, by the road sign maintenance device, a priority level for clearing obfuscation of the road sign based on at least one of the impending risk of failing to spot the road sign, the current extent of obfuscation of the road sign, the road sign, the time, or the geographical location.

According to some embodiments, wherein the recommendation comprises at least one of: an alert to a driver of a vehicle while approaching the geographic location, about the road sign; an alert to an obfuscation clearing agent, about the road sign, the geographic location, the current extent of obfuscation, and the time; orva prioritized schedule to the obfuscation clearing agent, wherein the prioritized schedule is generated based on the geographical location and the priority level, and wherein the prioritized schedule comprises information on each of one or more obfuscated road signs, the geographic location of each of the one or more obfuscated road signs, a priority level of each of one or more obfuscated road signs.

According to some embodiments, the image capturing device mounted on the vehicle captures at least some of the set of images when the vehicle makes one or more passes about the road sign over the period of time, and wherein the at least some of the set of images are from: one or more angles, one or more distance, and one or more time of the day.

Embodiments of the present disclosure may provide a system for detecting and managing obfuscation of a road sign. The system may include at least one memory configured to store computer program code instructions and at least one processor configured to execute the computer program code instructions to receive, a plurality of images from a plurality of vehicles over a period of time, wherein each of the plurality of images is captured by an image capturing device mounted on a vehicle from among the plurality of vehicle and is associated with a corresponding geographic location of the vehicle, and wherein a set of images from the plurality of images comprises a road sign in a geographic location that is at least partially obfuscated. The at least one processor of the system may be configured to determine an extent of obfuscation of the road sign in each of the set of images, wherein a current extent of obfuscation of the road sign is the extent of obfuscation of the road sign in most recent of the set of images. The at least one processor of the system may be configured to perform a time-series analysis of the extent of obfuscation of the road sign in each of the set of images to determine a rate at which the extent of obfuscation of the road sign is increasing. The at least one processor of the system may be configured to determine an impending risk of failing to spot the road sign, from an appropriate distance by the vehicle, based on the at least one of the current extent of obfuscation of the road sign and the rate at which the extent of obfuscation of the road sign is increasing. The at least one processor of the system may be configured to provide a recommendation based on the impending risk of failing to spot the road sign.

Embodiments of the present disclosure may provide a computer program product. The computer program product may comprise at least one non-transitory computer readable storage medium having computer-executable program code portions stored therein, the computer-executable program code portions comprising program code instructions configured to receive, a plurality of images from a plurality of vehicles over a period of time, wherein each of the plurality of images is captured by an image capturing device mounted on a vehicle from among the plurality of vehicle and is associated with a corresponding geographic location of the vehicle, and wherein a set of images from the plurality of images comprises a road sign in a geographic location that is at least partially obfuscated. The program code instructions may be configured to determine an extent of obfuscation of the road sign in each of the set of images, wherein a current extent of obfuscation of the road sign is the extent of obfuscation of the road sign in most recent of the set of images. The program code instructions may be configured to perform a time-series analysis of the extent of obfuscation of the road sign in each of the set of images to determine a rate at which the extent of obfuscation of the road sign is increasing. The program code instructions may be configured to determine an impending risk of failing to spot the road sign, from an appropriate distance by the vehicle, based on the at least one of the current extent of obfuscation of the road sign and the rate at which the extent of obfuscation of the road sign is increasing. The program code instructions may be configured to provide a recommendation based on the impending risk of failing to spot the road sign.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
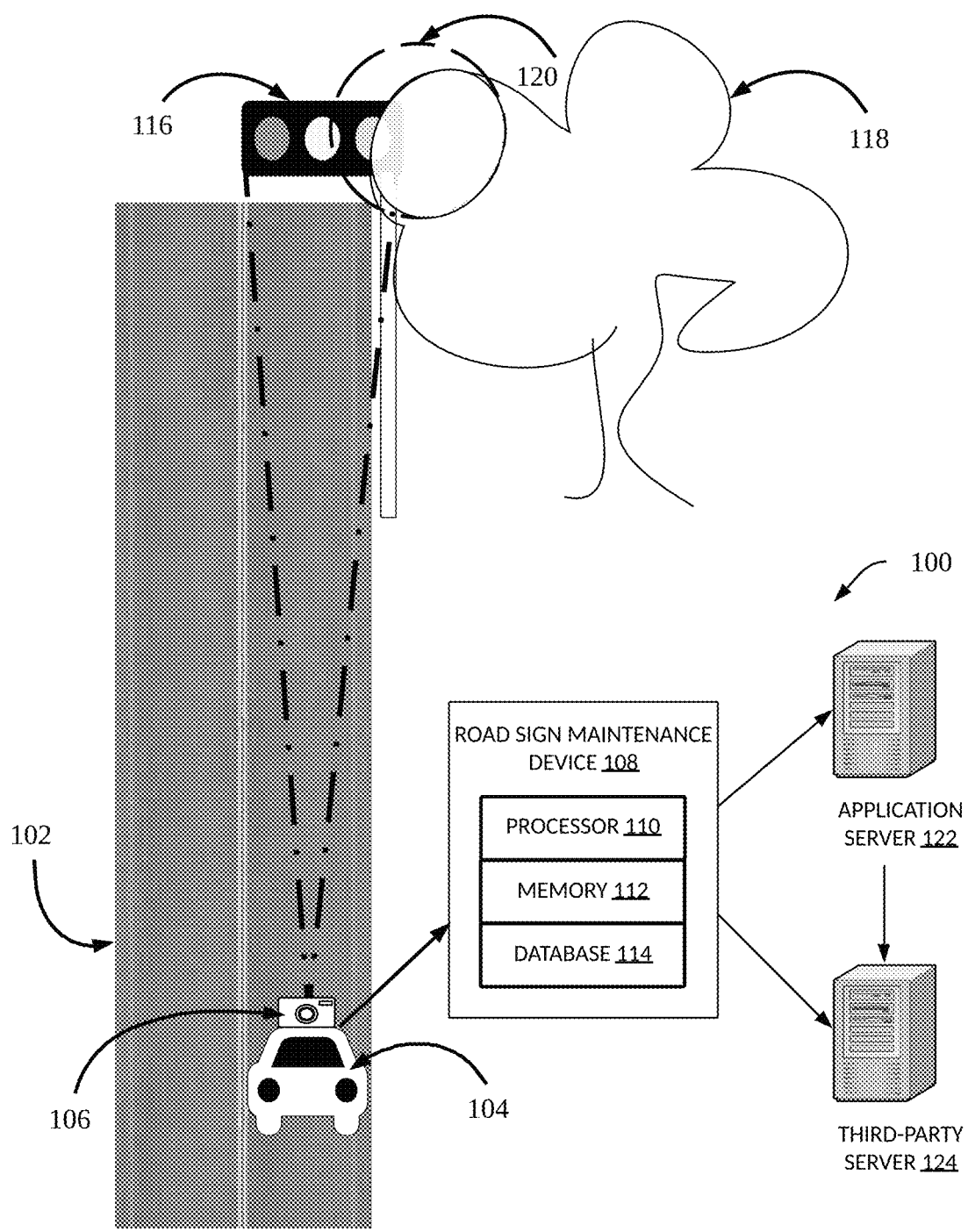
FIGS. 1-3 illustrate an exemplary system for detecting and managing obfuscation of a road sign, in accordance with an embodiment.

Unless otherwise indicated illustrations in the figures are not necessarily drawn to scale.

DETAILED DESCRIPTION

The present disclosure is best understood by reference to the detailed figures and description set forth herein.

Embodiments of the disclosure are discussed below with reference to the figures. However, those skilled in the art will readily appreciate that the detailed description given herein with respect to these figures is for explanatory purposes as the disclosure extends beyond these limited embodiments. For example, it should be appreciated that those skilled in the art will, in light of the teachings of the present disclosure, recognize a multiplicity of alternate and suitable approaches, depending upon the needs of the particular application, to implement the functionality of any given detail described herein, beyond the particular implementation choices in the following embodiments described and shown. That is, there are modifications and variations of the disclosure that are too numerous to be listed but that all fit within the scope of the disclosure. Also, singular words should be read as plural and vice versa and masculine as feminine and vice versa, where appropriate, and alternative embodiments do not necessarily imply that the two are mutually exclusive.

It is to be further understood that the present disclosure is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present disclosure. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

Figure 2:
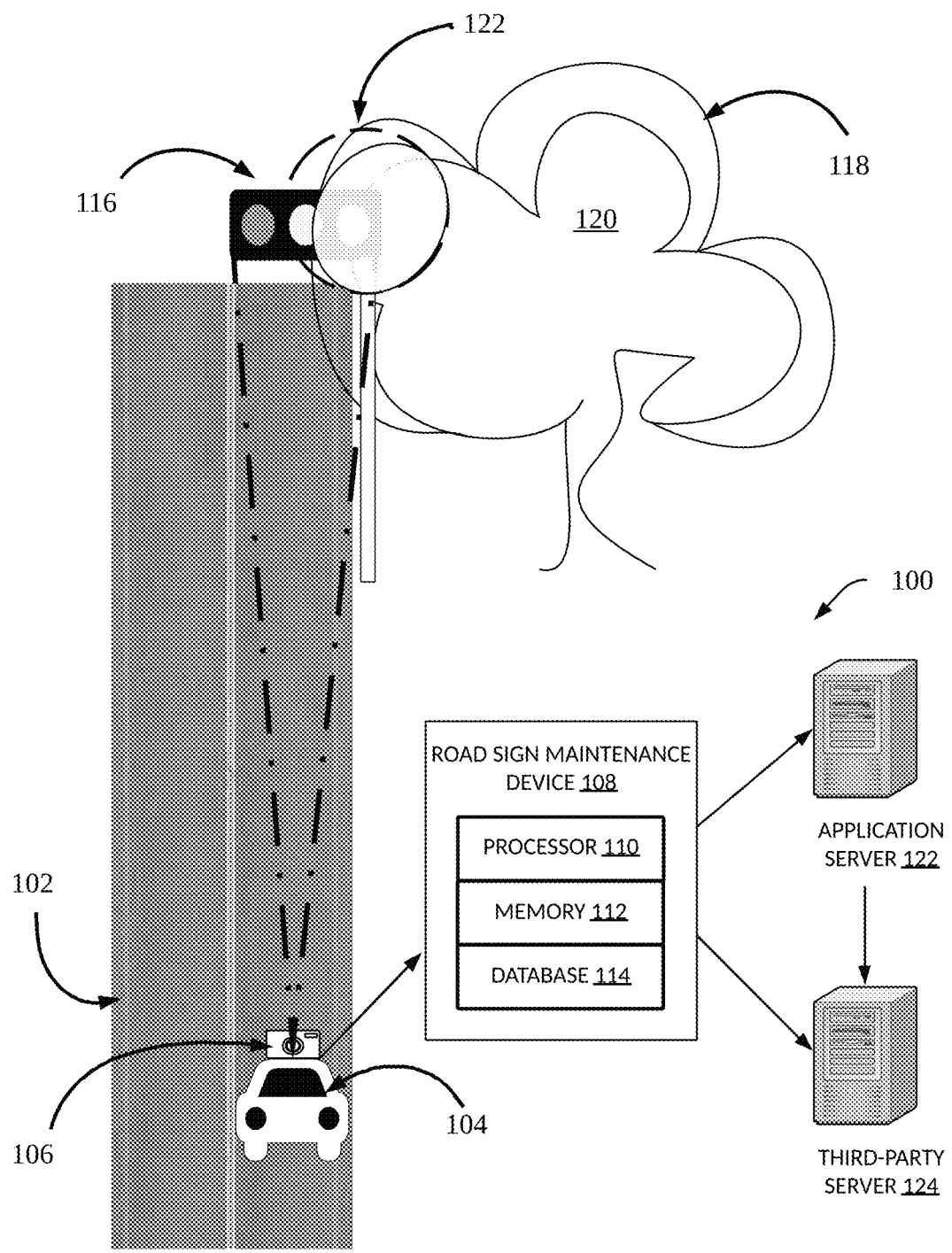
Figure 3:
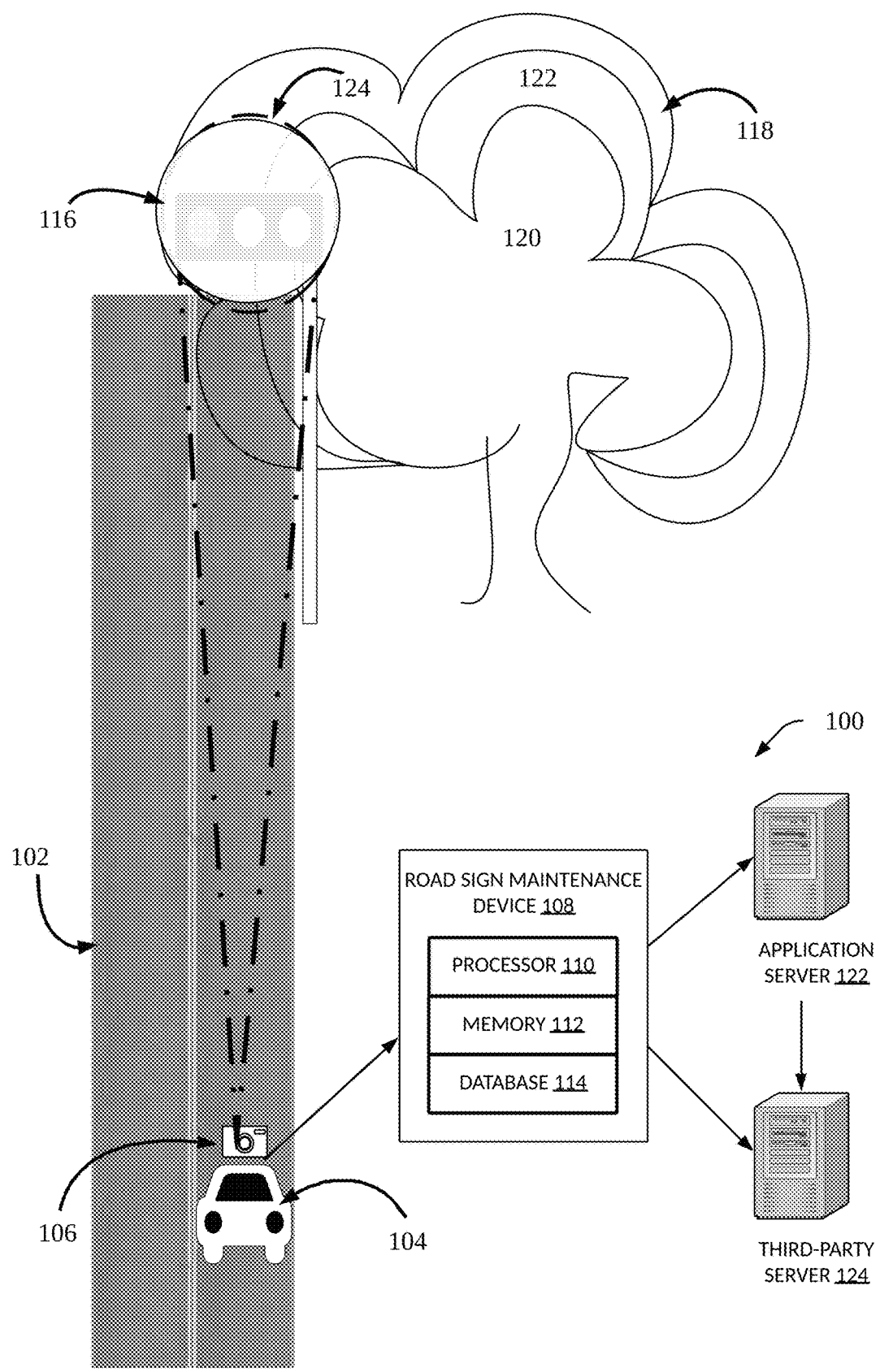

Referring to FIGS. 1-3, an exemplary system 100 for detecting and managing obfuscation of a road sign is illustrated, in accordance with an embodiment. The system 100 includes an image capturing device 106, a road sign maintenance device (e.g., a computing device 108 comprising a processor 110, a memory 112, a database 114), and an application server 122. It should be noted that, in some embodiments, at least some of the components of the road sign maintenance device may be a part of the image capturing device 106 while remaining of the components of the road sign maintenance device (i.e., the computing device 108) may be a part of the application server 122. Further, it should be noted that the image capturing device 106 may be mounted on the vehicle 104. Thus, in such embodiments, at least some of the components of the road sign maintenance device (i.e., the computing device 108) may be a part of the vehicle 104. The vehicle 104 may encounter a road sign 116 that may be obfuscated by an obfuscating element 118 while travelling on the road 102. As will be appreciated, the road sign 116 may be installed on the side of the road 102, while the obfuscating element 118 (for example, a tree) may be obfuscating the road sign 116 at least partially 120. Further, in some embodiments, the road sign maintenance device (i.e., the computing device 108) or the application server 122 may be in communication with a third-party server 124. The third-party server 124 may belong to the navigation map provider, the road sign maintenance authority, or so forth.

As stated above, the image capturing device 106 may be mounted on the vehicle 104. Additionally, an image capturing device 106 may be placed in a fixed location (not shown in the figures), such that, the road sign 116 is in direct line of sight of the image capturing device 106. In accordance with an embodiment, the image capturing device 106 may be configured to auto-focus on the road sign 116. In some embodiments, the image capturing device 106 may be remotely controlled by an administrator, for example, via the computing device 108. The image capturing device 106 may be communicatively coupled to the computing device 108 via a communication network (not shown in the figures). Examples of the communication network, may include, but are not limited to, Bluetooth connection, Ethernet cable, USB cable, WIFI, IRDA, etc. Thus, the computing device 108 may be able to remotely control and manage positioning, focus, and viewing angle of the image capturing device 106, based on specific requirements.

During a typical operation of the computing device 108, the image capturing device 106 disposed on the vehicle 104 may capture a plurality of images of a road sign 116 over a period of time. In accordance with an embodiment, the plurality of images may also be associated with a corresponding geographical location of the vehicle 104, that also provides a geographical location of the road sign. In one embodiment, the image capturing device 106 may capture the plurality of images based on predefined time intervals when the vehicle 104 passes the road sign 116. A set of images captured among the plurality of images includes a road sign 116 in a geographical location that is at least partially 120 obfuscated by the obfuscating element 118 (such as, but not limited to, a tree, a shrub, and a billboard). As shown in FIG. 2 and FIG. 3 the partial extent of obfuscation 120 may grow to a higher extent of obfuscation 122 (FIG. 2) which may further grow to complete extent of obfuscation 124 (FIG. 3). The at least some of the set of images may be captured from one or more angles, one or more distances, and one or more times of the day by the image capturing device 106. After capturing, the image capturing device 106 may transmit the plurality of images capturing the extent of obfuscation 120, 122 and 124 to the computing device 108 via the communication network. In an embodiment, the image capturing device 106 may also be configured to record an uninterrupted video of the road sign 116 whenever the vehicle 104 passes the road sign 116 and thus capture the extent of obfuscation 120, 122, 124 over a period of time. The video may then be split into the plurality of images at the computing device 108. Similarly, the additional image capturing device 106 (e.g., a CCTV camera facing the road sign), when placed in a stationary position (not shown in figure) in direct line of sight of the road sign 116 may capture the plurality of images of the road sign 116 at pre-defined time intervals and may transmit the plurality of images to the computing device 108 via the communication network.

It may be appreciated by a person skilled in the art that the road sign 116 may provide safe passage to vehicles and pedestrians on roads. Multiple road signs, such as the road sign 116 may be termed as road signage. There are three main types of road signs including regulatory signs, warning signs and guide signs. A regulatory sign is a reminder to drivers about traffic regulations and laws. While most regulatory signs are enforced at all times, some are conditional depending on the time of day and weather, but still may be followed as stated. Typical regulatory signs can come in a variety of shapes and colors, and include traffic lights, stop signs, speed limit signs, one-way signs, and yield signs. A warning sign may be used to draw the attention of a driver to an upcoming or possible hazard that will affect how they drive. It also alerts the driver to circumstances that they cannot easily spot, such as potential pedestrians, animal crossings or a speed bump in the road. Warning signs are generally pennant shaped and bright yellow with a reflective coating. A guide sign may state mileage and location-specific information such as, exit and entry signs for a freeway. Route signs also fall into this category, as they signal the route number and/or county travelers are in to help keep them up to date on their current location. They also include hiking, parking and rest stop signs. These types of signs are often rectangular and green or white but can take on a variety of unique shapes and colors depending upon the type of information displayed.

The regulatory sign, the warning sign, and the guide signs are respectively deployed in one of the road sign shapes that include, but are not limited to, octagons, equilateral triangles, circles, pennants, pentagons, crossbucks, diamonds, rectangles and trapezoids. The regulatory sign, the warning sign, and the guide signs are respectively deployed in one of the road sign colors that include, but are not limited to, black, blue, brown, green, orange, red, white and yellow. It may be appreciated by one skilled in the art that these popular shapes and colors are given specific meanings to help bring about a universal understanding of how to behave on the road.

It may further be appreciated by a person skilled in the art that though description of the current embodiment is limited to the obfuscation of road sign, the present disclosure may be applicable for other signs like billboards and hoardings.

In various embodiments, the obfuscating element 118 may include, but not limited to, plants, trees, solid objects, and lighting Signs may be obfuscated because of placement of the signs. Referring to FIGS. 4-12, are illustrated signs that are obfuscated by different obfuscating elements and may be located in different geographical locations.

Figure 4:
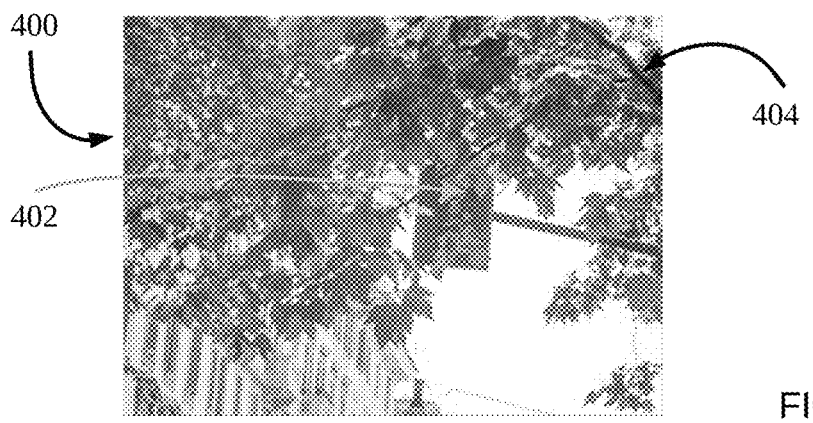
FIGS. 4-12 illustrate exemplary pictorial representations of obfuscated road signs, in accordance with some embodiments.

FIG. 4 illustrates an exemplary pictorial representation 400 of an obfuscated road sign, in accordance with an embodiment. As shown on FIG. 4 the road sign may be a traffic signal 402 obfuscated by a tree 404. In may be appreciated that any driver may find it difficult to read the traffic sign and take appropriate action on time. In one embodiment, as shown in FIG. 4 the traffic signal may be located in a busy intersection within city limits.

Figure 5:
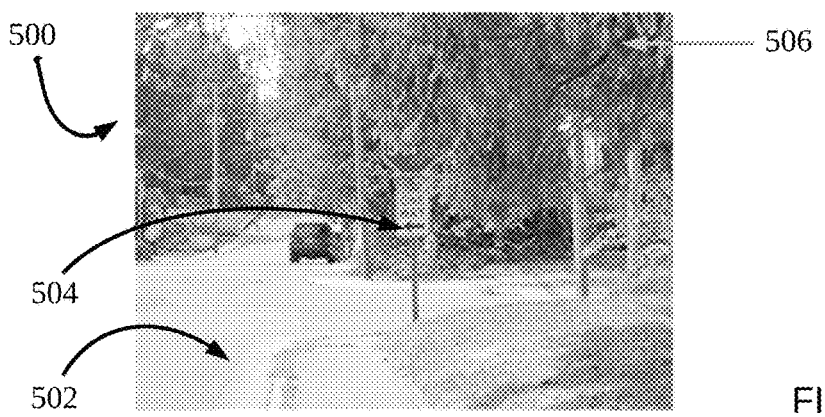

FIG. 5 illustrates an exemplary pictorial representation 500 of an obfuscated road sign, in accordance with an embodiment. As shown on FIG. 5 the road sign is a one-way sign 504 at a road intersection 502. The one-way sign 504 is partially obfuscated by a tree 506. In may be appreciated that any driver may find it difficult to read the traffic sign and take appropriate action on time. In one embodiment, as shown in FIG. 5 the traffic signal may be located in a less populated area.

Figure 6:
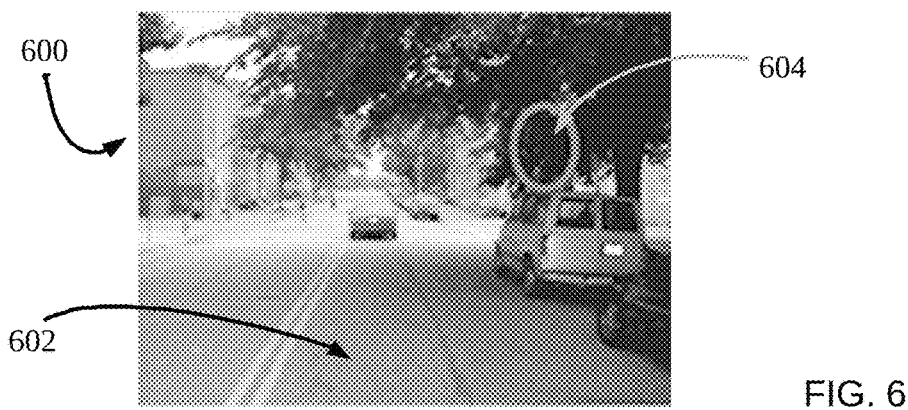

FIG. 6 illustrates an exemplary pictorial representation 600 of an obfuscated road sign, in accordance with an embodiment. As shown on FIG. 6 the road sign at an edge of road 602 is completely obfuscated 604. In may be appreciated that any driver may find it difficult to read the sign and take appropriate action on time. In one embodiment, as shown in FIG. 6 the traffic signal may be located inside city limits that sees heavy traffic.

Figure 7:
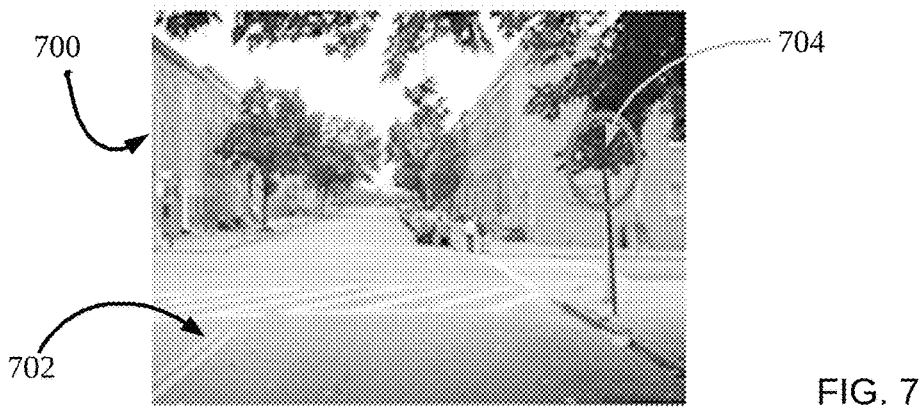
Figure 8:
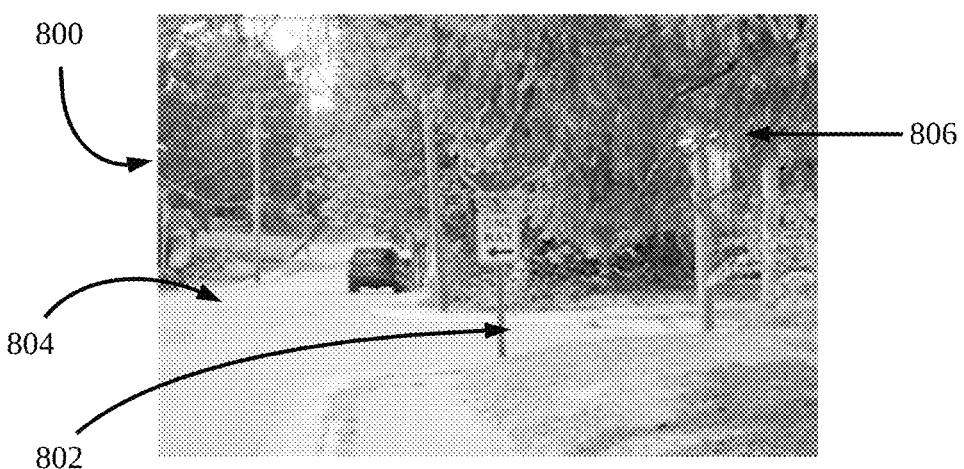

FIG. 7 and FIG. 8 illustrate an exemplary pictorial representation 700 and 800 of an obfuscated road sign, in accordance with an embodiment. As shown on FIG. 7 the road sign 704 at an edge of road 702 may be completely obfuscated With respect to FIG. 8, the road sign 806 at an edge of road 802 (for, example the one-way sign) is partially obfuscated. The road sign 806 may be positioned near a road intersection 804. In may be appreciated that any driver may find it difficult to read the sign and take appropriate action on time and safety issues may become more prominent when the road sign 806 is placed near the road intersection 804. In embodiments shown in FIG. 7 and FIG. 8 the road signs, viz., 704 and 806 may be located outside city limits that sees light traffic.

Figure 9:
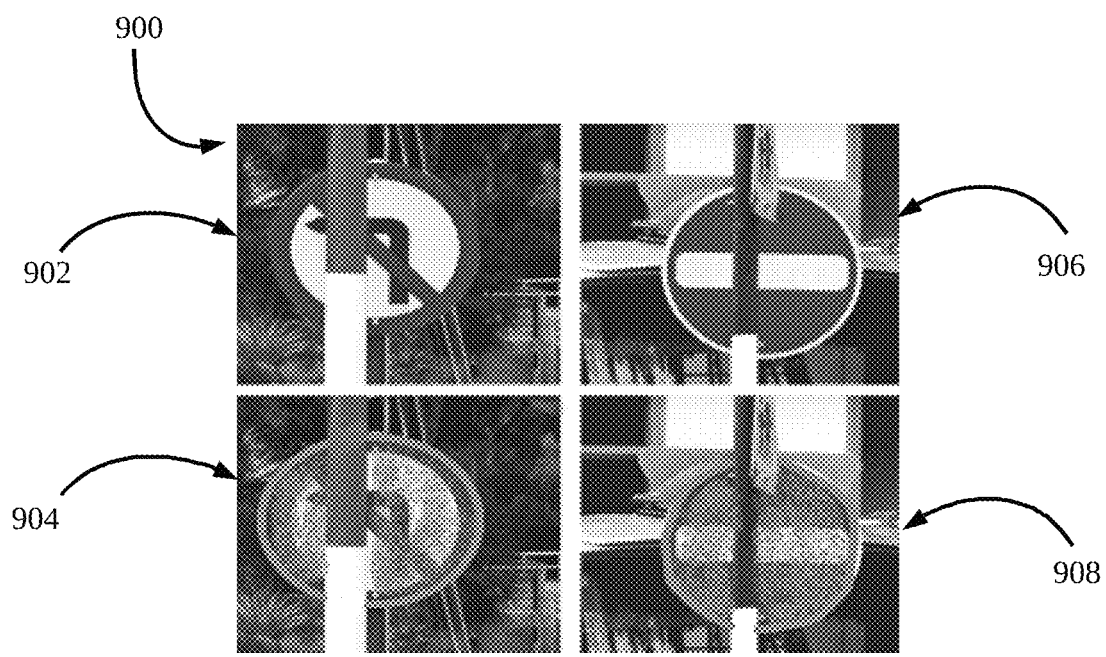
Figure 10:
Figure 11:
Figure 12:
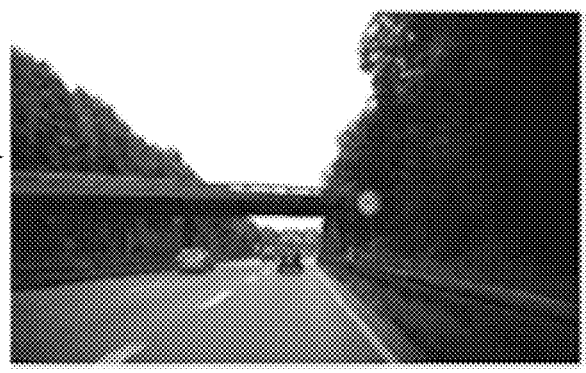

FIGS. 9-12 illustrate road signs obfuscated by different obfuscating elements like solid poles in FIG. 9, lighting in FIG. 10, inappropriate placement of signal under a bridge in FIGS. 11 and 12. For example, as illustrated in FIG. 9, each of the road signs 902, 904, 906, and 908 is obfuscated by solid poles placed in front of them.

The computing device 108 includes a designated software program to recognize signs, such as, but not limited to, traffic signs from the images or from a video stream and for reading the GPS position of the traffic signs provided by the vehicle 104. The designated software program may be created in different platforms/environments, with different programming languages (e.g., C++, Python, Android, etc.) and many libraries for computer visioning, even open source, such as OpenCV.

The computing device 108 may then detect and identify (or recognize) the type of road sign from the one or more images transmitted to the computing device 108 by the image capturing device 106. Accordingly, in one embodiment, the computing device 108 may follow a two-stage recognition process which may include traffic sign detection and recognition. The first stage of traffic sign detection may be mainly based on inherent information, such as color, shape and texture features of traffic signs. The designated computer program in the computing device 108 may be configured to accurately extract traffic sign candidate areas from the actual road scenes. Further, in second stage, the traffic sign recognition may be used by the designated computer program to analyze and classify the detected traffic signs and accurately obtain their actual meaning.

Figure 13:
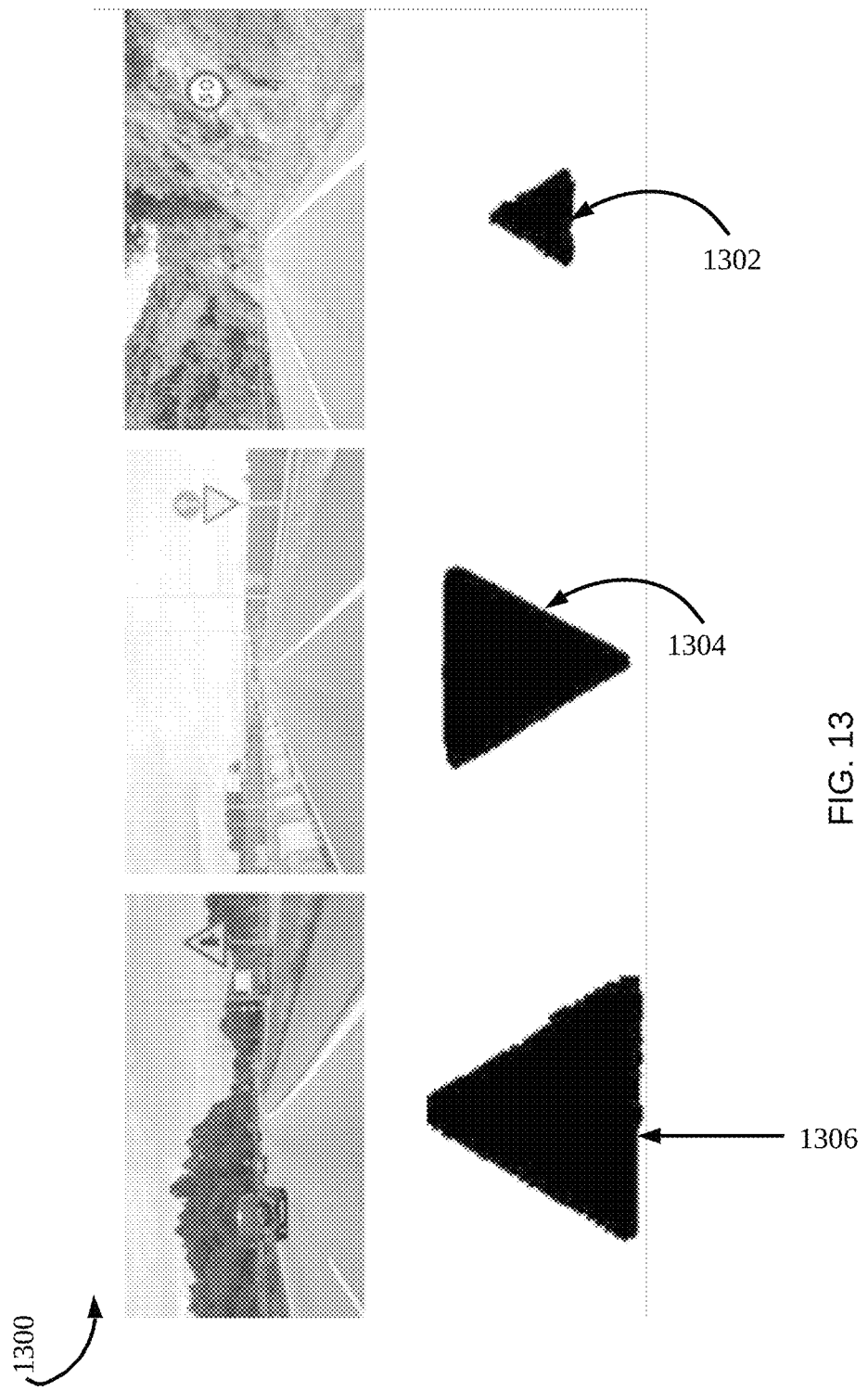
FIG. 13 illustrates a process of detecting a road sign in an exemplary system for detection and managing obfuscation of the road sign, in accordance with an embodiment.

FIG. 13 illustrates a step of detection of a road sign in an exemplary scenario 1300 for detection and managing obfuscation of road signs. Accordingly, in the first stage as shown in FIG. 13, the computing device 108 may be configured to use the designated computer program for detection. The aim of the first stage of detection is to distinguish any other object captured by the image capturing device 106 in the video or the plurality of images for a road sign. The detection may be based on the analysis of the shape of a road sign such as road signs (target), i.e., 1302, 1304, 1306.

The detected road sign may be partially or completely covered by obfuscating agents, such as plants or vegetation. The computing device 108 may accordingly detect and recognize the type of obfuscating agent and the extent of obfuscation of the road sign in each of the set of images, wherein a current extent of obfuscation of the road sign is the extent of obfuscation of the road sign in a most recent of the set of images from the plurality of images transmitted to the computing device 108 by the image capturing device 106. The computing device 108 may be configured to analyze the road sign and the extent of obfuscation by performing a time-series analysis of the extent of obfuscation of the road sign in each of the set of images to determine a rate at which the extent of obfuscation of the road sign is increasing. In one embodiment, the computing device 108 may be configured to use the designated computer program to calculate a percentage of reliability (reliability factor). In one embodiment, the reliability factor is an estimation of the percentage of the sign (such as, the road signs 1302, 1304, 1306) that may be sheltered. The reliability factor may be calculated using the plurality of images transmitted by the image capturing device 106 to the computing device 108 and the information on the size of the road sign stored in the database 114 of the computing device 108.

The computing device 108 may be configured to determine an impending risk of failing to spot the road sign, from an appropriate distance by the vehicle, based on the at least one of the current extent of obfuscation of the road sign and the rate at which the extent of obfuscation of the road sign is increasing. The computing device 108 may further be configured to use the analysis to provide an alert and a recommendation based on the impending risk of failing to spot the road sign for applying corrective measures. The recommendations may include, but are not limited to, providing an alert to a driver of a vehicle while approaching the geographic location, about the road sign, providing an alert to an obfuscation clearing agent, about the road sign, the geographic location, the current extent of obfuscation, and the time, and providing a prioritized schedule to the obfuscation clearing agent. The prioritized schedule may be generated based on the geographical location and the priority level. The prioritized schedule may comprise information on each of one or more obfuscated road signs, the geographic location of each of the one or more obfuscated road signs, and a priority level of each of one or more obfuscated road signs.

Referring to FIG. 1, the database 114 may include, but may not limited to, a plurality of data servers, and a memory card. It may be appreciated by a person skilled in the art that the database (containing one or more images of road signs which are obfuscated to different extents and are located in particular geographical locations) may contain virtually any road sign related information that enables the computing device 108 to analyze the data, generate alerts, and provide suggestions as described hereinabove. In another embodiment, the information may be stored in a memory card 112 in the computing device 108.

In certain embodiments, the database may be included within a storage device which may include any portable storage device or the storage device may be internet based. Non-limiting examples of portable storage media include computer readable devices like USB, DVD, etc. Non-limiting examples of Internet-based storage media include cloud drive, data download web link, etc. The captured, analyzed, and generated information on the extent of obfuscation of a road sign used for providing recommendations to manage the obfuscation may be stored in a local computing platform and/or network. In an alternative embodiment, the captured, analyzed, and generated information on the extent of obfuscation of a road sign used for providing recommendations to manage the obfuscation may be located on a local computer network.

The computing device 108 may further communicate to any number of devices through the communication network. The computing device 108 may be communicatively coupled to virtually any device by means such as, but not limited to, Bluetooth connection, Ethernet cable, USB cable, WIFI, IRDA, etc. In one embodiment, the computing device 108 may connect to other devices for gathering additional information on the road sign. In one embodiment, the additional information of the road sign may include, but not be limited to, information on the shape, size, color, and like features of the road sign, the geographical location of the road sign, the type of obfuscating elements, when the obfuscating element is a plant/tree then the type of plant/tree and their rate of growth or type of spread of the plant/tree and like information. In another embodiment, the computing system 108 may be communicatively coupled to other devices for transmitting the alerts and recommendations to manage the extent of obfuscation 120, 122, 124 (as shown in FIG. 3). To this end, the computing device 108 may include a memory 112 to store one or more instructions, wherein the one or more instructions, may be executed by the processor 110.

It may be appreciated by a person skilled in the art, that the recommendations generated from the analysis of the captured image may be stored in the database 114. In accordance with an embodiment, a machine learning model may be deployed with the computing device 108. The machine learning model may be trained on a data set to analyze a variety of images captured by the image capturing device 106 of a variety of road signs and obfuscation types. In accordance with another embodiment, a trained machine learning model may be obtained and the computing device 108 may be configured to detect and manage obfuscation of a road sign, based on the trained machine learning model.

It may be appreciated by a person skilled in the art, in light of and in accordance with the teachings of the present disclosure, the computing device 108 may include virtually any computer device capable of processing the images received from the image capturing device and generating recommendations for managing obfuscation. Non-limiting examples of the computing device 108 includes a computer, laptop, a phablet, a tablet, an application server, a smart phone, and a cloud computing device. The computing device 108 may be a single device or may be a combination of communicatively coupled multiple devices. In embodiments where the computing device 108 is a single device, all the functions of receiving the video, receiving other related information of the road sign, processing, and formatting gathered information, generating recommendation for managing the obfuscation, may be executed by the single computer system 108. In embodiments where the computing device 108 includes multiple devices these functions may be distributed between the multiple devices. For example, the gathering, processing, and formatting of the gathered information may be done by one computing system and the captured, analyzed, and generated information on the extent of obfuscation of a road sign used for providing recommendations to manage the obfuscation may be executed by a second device.

In certain embodiments, the captured, analyzed, and generated information on the road sign and extent of obfuscation of the road sign may partially or completely be stored in a local computing platform and/or network. In an alternative embodiment of the present disclosure, the captured, analyzed, and generated information on the road sign and extent of obfuscation of the road sign may be located on a local computer network, such as user equipment of a vehicle.

Figure 14:
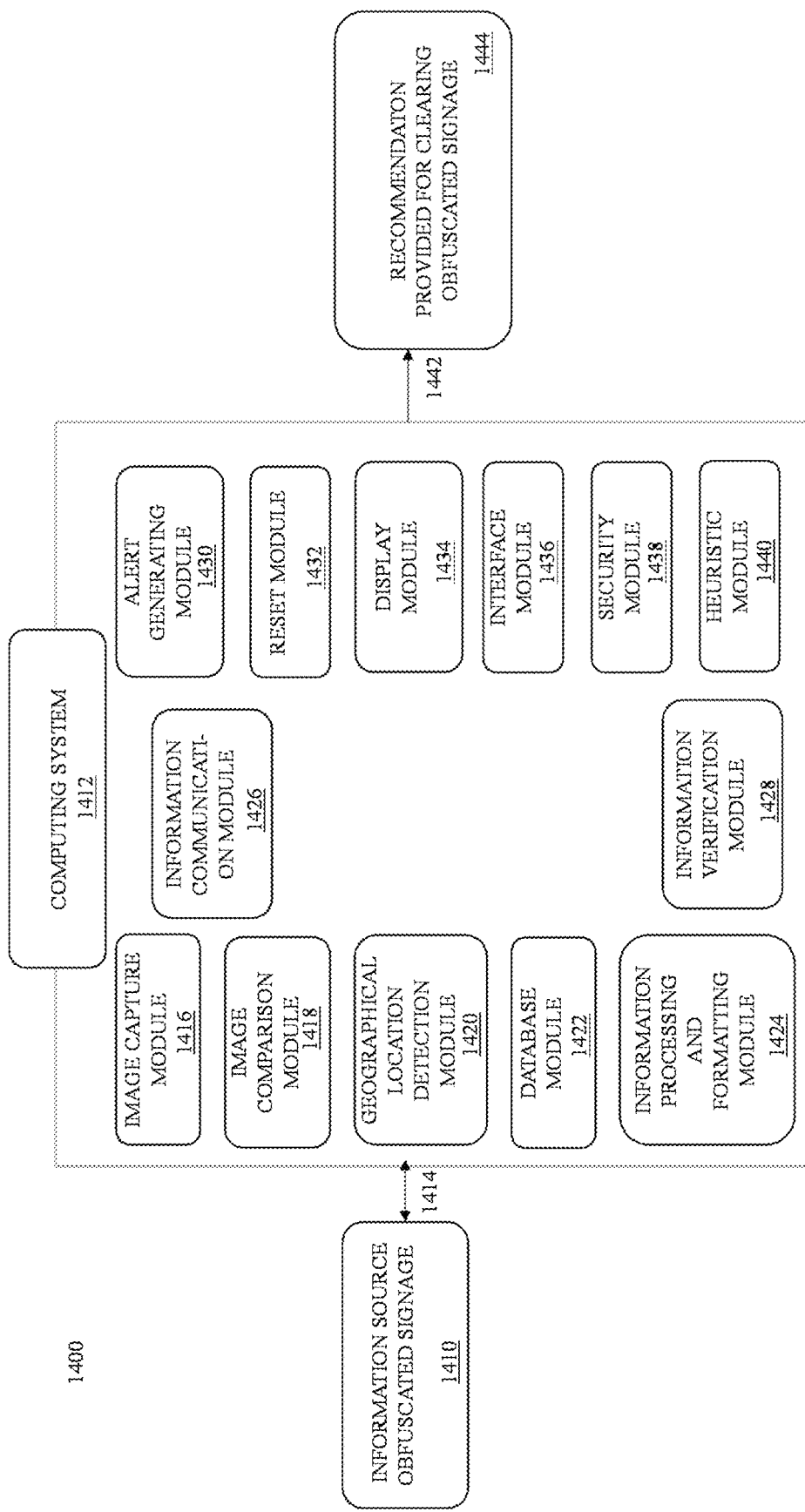
FIG. 14 illustrates a functional block diagram of an exemplary system for detecting and managing obfuscation of a road sign, in accordance with an embodiment.

FIG. 14 illustrates a functional block diagram of an exemplary system 1400 (analogous to the system 100 of FIGS. 1-3) for detecting and managing obfuscation of a road sign, in accordance with an embodiment. As illustrated in the block diagram of an exemplary system 1400 for detecting and managing obfuscation of a road sign may comprise a computing system 1412 (analogous to the computing device 108 of FIGS. 1-3) that receives input 1414 from an information source 1410 and provides an output 1442 that includes recommendations for clearing the obfuscation from a sign 1444 if deemed necessary. The computing system 1412 includes an image capture module 1416, an image comparison module 1418, a geographical location detection module 1420, a database module 1422, an information processing, and formatting module 1424, an information communication module 1426, an information verification module 1428, an alert generating module 1430, a reset module 1432, a display module 1434, an interface module 1436, a security module 1438, and a heuristic module 1440.

The image capture module 1416, may be configured to capture an image (still and moving image) Examples of the image capture module 1416 may include, but not limited to, a camera 106 or virtually any camera, that could be used as an image information source of the road sign and any obfuscation on the road sign. Image capturing device 106 may further include devices such as, but not limited to, digital cameras, web cameras, video cameras, closed circuit television camera, inbuilt camera of a smart device, etc. In one embodiment of the present disclosure, the image capturing device 106 may be an integrated web camera on a personal computer, tablet or laptop fixed on the vehicle 104.

The image comparison module 1418, may be configured to compare the plurality of images captured by the image capturing device 106. Examples of the image comparison module 1418 a processing unit, a computer, or a server to execute computer code and/or algorithms from a non-transitory computer readable medium for storing information. The image comparison module 1418, may further include a designated computer program installed in the computing device 108. The designated computer program may be capable of comparing the plurality of images and determining a corresponding geographical location of the vehicle/road sign, an extent of obfuscation of the road sign in each of the set of images.

The geographical location detection module 1420, may be configured to detect the geographical location of a road. For example, a global positioning system, that gathers information on the location of the vehicle and the road sign. In one embodiment, the geographical location detection module 1420 may be integrated with the image capturing device 106 disposed in the vehicle 104. In another embodiment, the geographical location detection module 1420 may be located in a stand-alone device disposed in the vehicle 104. The geographical location detection module 1420 may be configured to communicate the geographical location of the vehicle and the road sign to the computing device 108.

The database module 1422 may be configured to store information associated with obfuscation of road sign and the geographical location of the road sign in the form of images and location co-ordinates, such as, without limitation, a processing unit, a computer, or a server to execute computer code and/or algorithms from a non-transitory computer readable medium for storing information. Therefore, the database module 1422 may comprise virtually any data relevant to the obfuscation of road sign to enable the computing device 108 to analyze the data, and to provide recommendations and suggestions as described hereinabove. In one embodiment, the database module 1422 may be located in a computing device physically different from the computing device 108 but may have similar features and means like the computing device 108.

Information processing, and formatting module 1424 may be configured to process an image, geographical information and other gathered information. Examples of the information processing, and formatting module 1424 may include a processing unit, a computer, or a server to execute computer code and/or algorithms from a non-transitory computer readable medium for image recognition.

An information communication module 1426 may be configured to communicate information associated with road signs on roads. Examples of the information communication module 1426 may include a processing unit, a computer, or a server to execute computer code and/or algorithms from a non-transitory computer readable medium for communicating information, such as, information gathered using the image capture module 1416, image comparison module 1418, geographical location detection module 1420, alerts generated by alert generating module 1430, and reset information provided by reset module 1432, to the computing system 1412.

An information verification module 1428 may be configured to verify information such as, information gathered using the image comparison module 1418, geographical location detection module 1420, alerts generated by alert generating module 1430, and reset information provided by reset module 1432, to the computing system 1412. For example, a processing unit, a computer, or a server to execute computer code and/or algorithms from a non-transitory computer readable medium.

An alert generating module 1430 may be configured to generate an alert. Examples of the alert generating module 1430 may include a processing unit, a computer, or a server to execute computer code and/or algorithms from a non-transitory computer readable medium for alerting a concerned person or authority, such as, road sign maintenance person or authority. The alert may be a visual alert, or a voice alert activated via the computing device 108. In certain embodiments, the alert may be directly transmitted to a device accessible by a maintenance authority, such as, a handheld device, a personal device, a mobile device, a personal computer, and the like. The maintenance authority in various embodiments may include a municipal authority, a local authority authorized by the municipal authority, or a private authority authorized by the municipal authority to manage the obfuscation.

A reset module 1432, may be configured to reset some or whole of the computing system 1412, if needed. Examples of the reset module 1432 may include a processing unit, a computer, or a server to execute computer code and/or algorithms from a non-transitory computer readable medium for generating a reset command to be sent to the computing device 108 of the road sign maintenance device. The reset module 1432 may transmit the reset alert through the alert generating module 1430, for example, to indicate that a road sign obfuscation for a particular road sign located in a particular geographical location has been cleared and the sign can be re-monitored for increase in extent of obfuscation.

A display module 1434 may be configured to display images of obfuscated signs, cleared signs, suggestions/recommendations or alerts, such as, without limitation, a display screen unit controlled by the computing device 108, to a road maintenance authority.

Interface module 1436 may be configured to receive and transmit information from devices/components of network environment of the disclosed system. Examples of the interface module may include a processing unit, a computer, or a server to execute computer code and/or algorithms from a non-transitory computer readable medium for transmitting images, suggestions and alerts to the database module 1422 and receiving information from components or devices communicatively coupled to the computing system 1412.

A security module 1438 may have means of securing data, such as, without limitation a processing unit, a computer, or a server to execute computer code and/or algorithms from a non-transitory computer readable medium for ensuring that no misuse of sign information may take place. The alert generation module 1430 may also generate an alert when the security is breached with reference to the data.

A heuristic module 1440 may be configured to process the data/information provided by the image capture module 1416, the image comparison module 1418, and the geographical location detection module 1420 and providing pointers to the road maintenance authorities based on a self-learning model, for example, direct user to clear obfuscation based on a similar image captured at an alternate geographical location for a different sign that may be obfuscated. Examples of the heuristic model may include a processing unit, a computer or a server to execute computer code.

It will be appreciated by a person skilled in the art that virtually any algorithm and/or computer code may be used to self-learn using the heuristic module 1440. Self-learning algorithms and/or methods may include, without limitation, the use of artificial intelligence, however, the development of self-learning algorithms are really the new or current state-of-the-art if coupled with smart sensors and electro-mechanical systems the opportunities are infinite.

In one embodiment, one or more modules may be embodied in a single device. In an alternative embodiment of the present disclosure, all modules except the alert generating module 1430 and the reset module 1432 may be embodied in a computer or laptop device belonging to the road maintenance authority. The computer or laptop device would be capable of receiving information on the obfuscated sign and geographical location of the obfuscated sign, processing, formatting, and organizing the information, to be transmitted to a road maintenance device that can provide suggestions and recommendations for removing the obfuscation to the road maintenance authority.

In one embodiment, virtually any algorithm and/or computer code may be used to recognize and capture an image on the image capture module 1416 and the information processing, and formatting module 1424. Image recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present disclosure, a binary search tree may be implemented to extract data from visual images.

In one embodiment, virtually any algorithm and/or computer code may be used to recognize and capture geographical information of the sign on the geographical location detection module 1420 and the information processing, and formatting module 1424. Information recognition algorithms and/or methods may include, without limitation, signal triangulation, GPS data processing, etc.

In certain embodiments, there may be a plurality of the same modules in a system for detecting and managing obfuscation of a road sign. A plurality of modules such as, without limitation, an image capture module 1416, an image comparison module 1418, a geographical location detection module 1420, a database module 1422, an information processing, and formatting module 1424, an information communication module 1426, an information verification module 1428, an alert generating module 1430, a reset module 1432 a display module 1434, an interface module 1436, a security module 1438, and a heuristic module 1440 may be present in a system for detecting and managing obfuscation of a road sign 400. The plurality of similar modules may work in parallel or independently to improve the throughput and/or speed of a system for detecting and managing obfuscation of a road sign 1400. In an alternative embodiment of the present disclosure, a plurality of capture, processing, formatting, and organizing, generation, display, interface, and storage modules may be connected to a system for detecting and managing obfuscation of a road sign 1400 via wired and wireless connections to access resources from different wired and wireless networks.

It may be appreciated by a person skilled in the art, that one or more modules may transmit capture information to a tech support server that is on an accessible network or over the internet. In an alternative embodiment of the present disclosure, additional captured information may be sent to a server to alleviate processing load on a system for detecting and managing obfuscation of road signs.

In certain embodiments, any module in a system for detecting and managing obfuscation of a road sign 1400 may perform data manipulation. Data manipulation such as, but not limited to, compression, encryption, and formatting. In an alternative embodiment of the present disclosure, any module transmitting data may first compress the data prior to data transmission.

Figure 15:
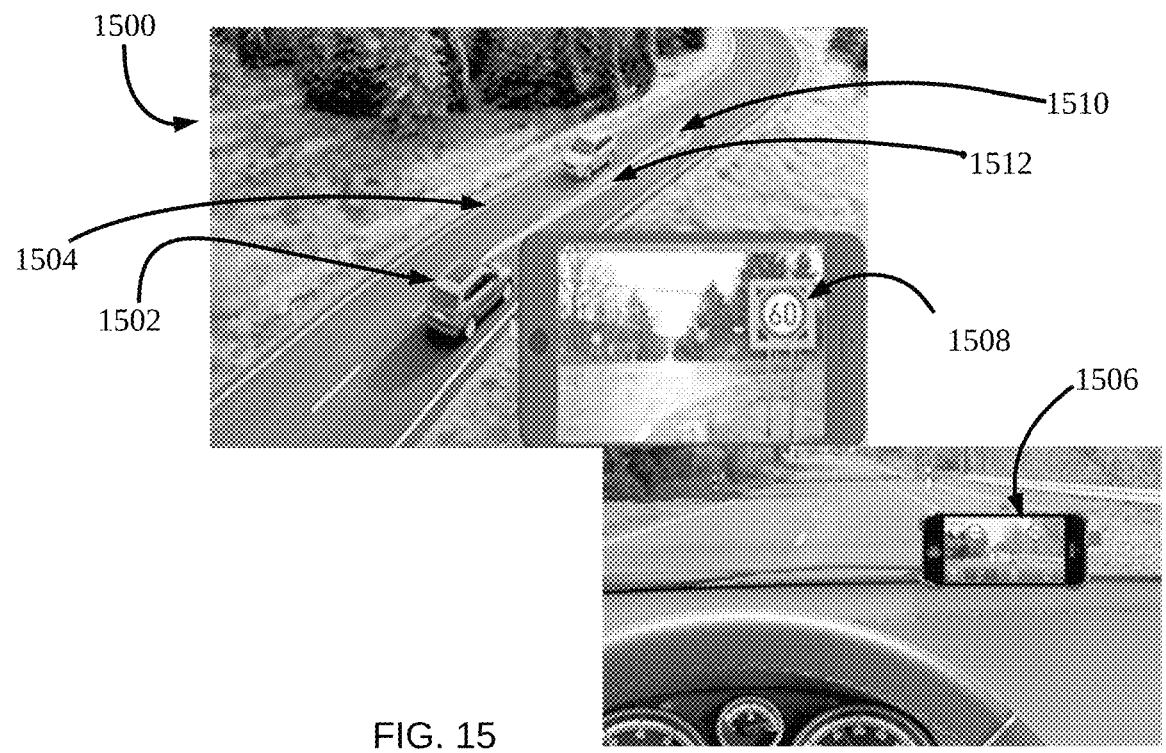
FIGS. 15-16 illustrate pictorial representations of a portion of an exemplary system for detecting and managing obfuscation of a road sign, in accordance with an embodiment.

FIG. 15 illustrates a pictorial representation of a portion of an exemplary scenario for detecting and managing obfuscation of a road sign by a computing device, in accordance with an embodiment. As shown in FIG. 15, a vehicle 1502 travelling on a road 1504 is equipped with an image capturing device 1506 to capture an image 1508 of a road sign 1510 in the path of vision 1512 of the image capturing device 1512. In one embodiment, as shown in FIG. 15 the image capturing device 1506 is a mobile phone that may be suitably placed inside the vehicle 1502, for example, on the vehicle dashboard 1508, to enable the image capturing device 1506 to take pictures of road signs, such as, the speed limit sign 1510 as shown in FIG. 15.

Figure 16:
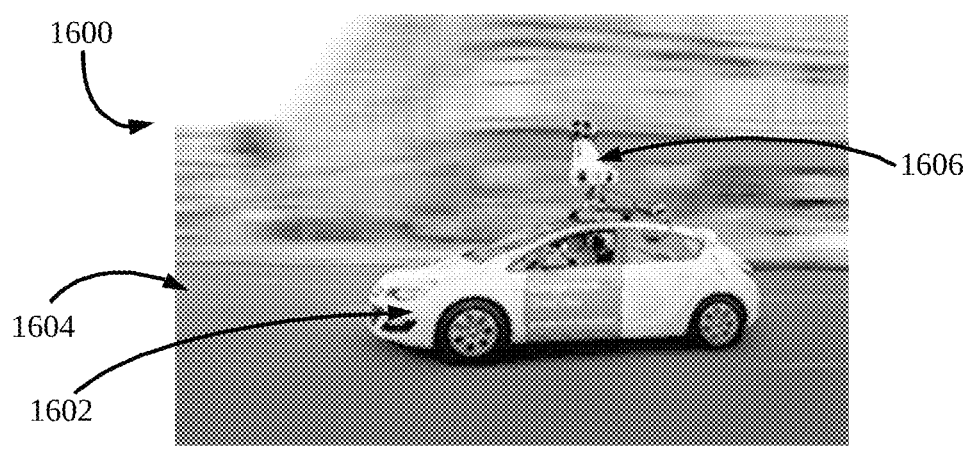

FIG. 16 illustrates a pictorial representation of a portion of an exemplary scenario for detecting and managing obfuscation of a road sign 1600 by the computing device 108, in accordance with an embodiment. As shown in FIG. 16, a vehicle 1602 travelling on a road 1604 is equipped with an image capturing device 1606 on the roof of the vehicle 1602 to capture an image or a video of the road signs along a route traversed by the vehicle.

As mentioned herein above, the reliability factor calculated by the computing system 104 using the designated computer program is an estimation of the percentage of a road sign that is obfuscated or sheltered by an obfuscating agent. In one embodiment, the higher the value of the reliability factor the alert module 1430 may generate a higher level of alert. The alerts generated may have different levels of priority according to a percentage of obfuscation/sheltering of surface of the road sign, the type of road sign, and the position/geographical location of the road sign. In various embodiments, the level/priority of alert for removal of obfuscation may be customized based on the authority responsible of managing the system for detecting and managing obfuscation of road signs. For example, regulatory or warning road signs may have a higher priority of alert compared to guide/information road signs. Furthermore, road signs withing a city limit may have a higher priority to road signs on country roads.

In one embodiment, a high alert may be raised when the computing system 108 detects the presence of a road sign located within city limits and may have a reliability factor lower than 50 percent for some type of road signs, for example, the road signs that fall into categories of precedence, danger and prohibition. The road signs under the category of precedence may include, but not limited to, stop, two-way traffic and precedence. The road signs under the category of danger may include, but not limited to, dangerous curve, railway crossing and pedestrians. Further, the road signs under the category of prohibition may include, but not limited to, access, transit and overtaking.

In yet another embodiment, a high alert may be raised when the computing system 108 detects the presence of a road sign located within city limits and may have a reliability factor lower than 70 percent for some other type of road signs, for example, the signals that fall within the category of information panels, supplementary panels, indications, and so forth. In one embodiment, a medium alert may be raised when the computing system 108 detects the presence of a road sign partially hidden by plants. In this case, the recognition reliability factor may be between about 50 percent to about 70 percent for any kind of road sign. In one embodiment, a low alert may be raised when the application detects the presence of a road sign slightly covered by vegetation and the recognition reliability factor is between about 70 percent to about 90 percent within city limits or the sign is on a country road.

Figure 17:
FIG. 17-18 illustrate scenarios when the system for detecting and managing obfuscation of road signs issues various level of alerts, in accordance with one embodiment.
Figure 18:
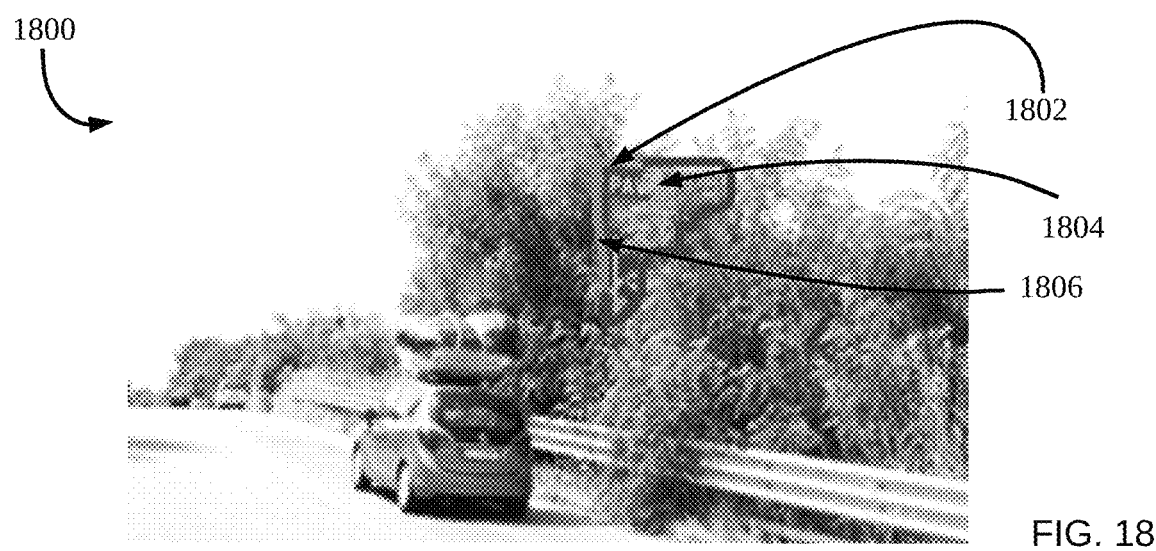

Referring to FIGS. 17-18 is illustrated scenarios 1700, 1800 when the system (the computing device 108) for detecting and managing obfuscation of road signs issues various level of alerts, in accordance with one embodiment.

FIG. 17 illustrates a road sign 1702 within city limits where the road sign is about 70 percent obfuscated 1704 and about 30 percent visible 1706. However, since the sign is located within city limits, the computing system 108 may generate a high-level alert for responsible authorities to clear the obfuscation.

FIG. 18 illustrates a road sign 1802 on a country road where the road sign is about 50 percent obfuscated 1804 and about 50 percent visible 1806. However, since the sign is located on a country road, the computing system 108 may generate a low or medium level alert for responsible authorities to clear the obfuscation.

Figure 19:
FIG. 19 illustrates a pictorial representation of completely obfuscated road sign on a country road, in accordance with one embodiment.
Figure 20:
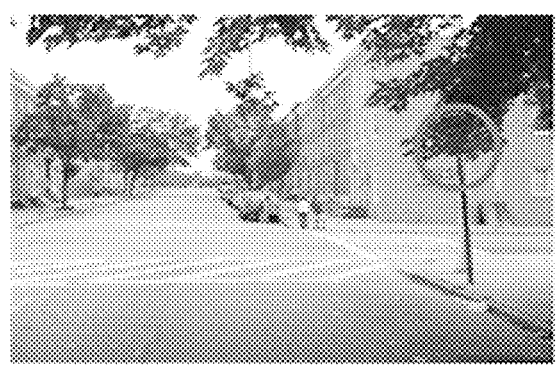
FIG. 20 illustrates a pictorial representation of completely obfuscated road sign on a city road, in accordance with one embodiment.

FIG. 19 illustrates a pictorial representation of a completely obfuscated road sign on a country road and FIG. 20 illustrates a pictorial representation of a completely obfuscated road sign on a city road. However, since the sign in FIG. 19 is located on a country road, the computing system 108 may generate a low or medium level alert and since the sign in FIG. 20 is located on a city road, the computing system 108 may generate a high level alert for responsible authorities to clear the obfuscation.

The alert issued by the alert generating module may be used to generate an alert message. An alert message may include different information in addition to the level of priority of the alert, including but not limited to, a photo, the location of the target, the type of road sign and especially an estimation of the percentage of the sign hidden by the obfuscating agents. In one embodiment, it is not necessary to have the exact position of the target, however, what matters is the position of the image capturing device 106 that captured the image. The position of the image capturing device 106 provides a point at a distance from the road sign form where there is poor visibility. In some embodiments, the computing device 108 may send each alert message to a remote server (or hereinafter referred as server) such as the application 122 server or the third-party server 124. The server may collect all the messages, relate or map match the messages geographically based on their position and classify the messages chronologically. Every time an alert message is received by the server, a designated software program on the server checks whether the alert is from one of the existing geographical sectors in the database and may generate a new geographical sector if there is no prior reference to the geographical sector, in one embodiment. Each new geographical sector may be created using the position of an alert message that does not reside in any geographical sector that already exist in the database/memory of the server. In one embodiment, each geographical sector may be considered as an area covering a few tens of meters in diameter. It may be appreciated by one skilled in the art that an area of this size may typically contain more than one road sign, but the area is still small enough to allow a road maintenance device to identify problems. In another embodiment, when the alert is received from one of the existing geographical sectors, then the alert message is assigned to the specific sector.

Figure 21:
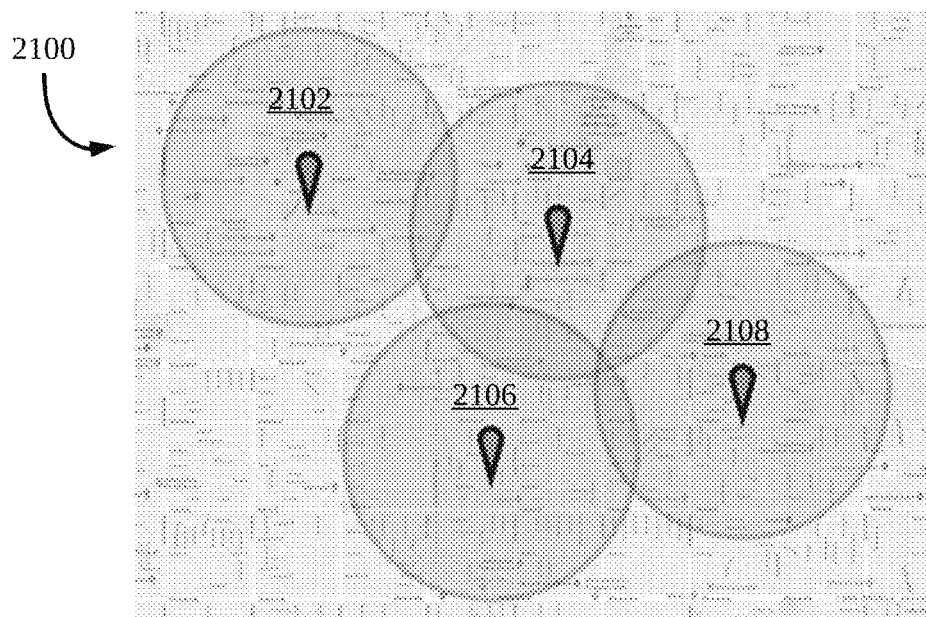
FIG. 21 illustrates an exemplary pictorial representation of road sign located in different geographical sectors, in accordance with an embodiment.

FIG. 21 illustrates an exemplary pictorial representation 2100 of road sign located in different geographical sectors, in accordance with an embodiment. As shown in FIG. 21 a road sign may be located in any exemplary sector 2102, 2104, 2106, and 2108 and the server will either generate a new geographical sector and assign the alert message to a new geographical sector or assign the alert message to one of the existing geographical sector based on the location of the image capturing device 106. Accordingly, each geographical sector may be characterized by a set of alert messages which, accumulate over time and may be analyzed to return an index to determine whether there is a need to intervene in that area. Eventually some places may be considered high priority areas for removal of obfuscation compared to other places, for example, obfuscated signs on city roads as compared to country roads.

In one embodiment, the computing system 108 may also take into consideration the increment or decrement of the hidden section of the sign in order to proactively forecast the change in a low alert to a medium alert or high alert. In one embodiment, if multiple alert messages for a specific road sign located in a specific geographical sector show an increment of the obfuscated part of the sign, it indicates that the obfuscation, (for example, the plant) is growing. Eventually a growth rate of the plant may be calculated to forecast when the percentage of obfuscation of the sign is large. Further, the computing system 108 may analyze the information from the geographical sector to check whether the data collected reflects certain configurable conditions. A managing authority, for example a municipal authority, may configure an intervention index on a specific sector, providing conditions such as "the frequency of high alerts must be greater than an A value and that of medium alerts must be greater than B", or "the number of alerts of medium priority must be higher than B" and the like. In one embodiment, if the intervention index is verified, an alarm may be sent for the specific geographical sector to a road sign maintenance authority with all the information necessary to be enable the authority to intervene in the area of interest and clear the obfuscation.

Figure 22:
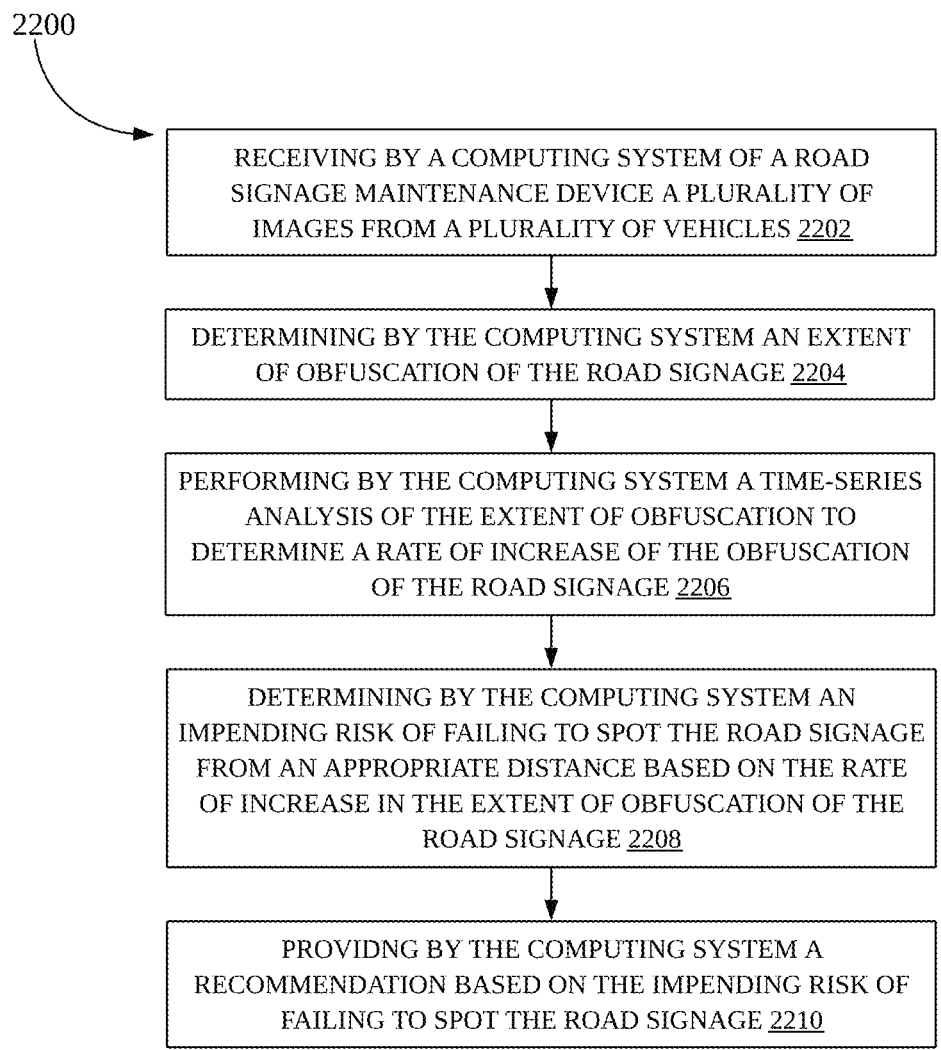
FIG. 22 is a flowchart of an exemplary method for detecting and managing obfuscation of a road sign, in accordance with an embodiment.

FIG. 22 is a flow chart illustrating an exemplary method 2200 for detecting and managing obfuscation of a road sign, in accordance with an embodiment. A method for detecting and managing obfuscation of a road sign begins at step 2202.

At step 2202, a road sign maintenance device (i.e., the computing device 108) may receive a plurality of images from a plurality of vehicles over a period of time. Each of the plurality of images may be captured by an image capturing device 106 mounted on each vehicle 104 from among the plurality of vehicles. Further each image may be associated with a corresponding geographical sector location of the vehicle 104. A set of images of the plurality of images include a road sign in a particular geographic sector location, wherein the road sign is at least partially obfuscated.

At step 2204, the road sign maintenance device may determine an extent of obfuscation of the road sign in each of the set of images, wherein a current extent of obfuscation of the road sign is the extent of obfuscation of the road sign in most recent of the set of images.

At step 2206 the road sign maintenance device may perform a time-series analysis of the extent of obfuscation of the road sign in each of the set of images to determine a rate at which the extent of obfuscation of the road sign is increasing.

At step 2208, the road sign maintenance device may determine an impending risk of failing to spot the road sign, from an appropriate distance by the vehicle, based on the at least one of the current extent of obfuscation of the road sign and the rate at which the extent of obfuscation of the road sign is increasing. The road sign maintenance device determines whether the current extent of obfuscation of the road sign is more than a pre-determined threshold and forecasts a time when the current extent of obfuscation of the road sign is more than the pre-determined threshold based on the rate at which the extent of obfuscation of the road sign is increasing.

At step 2210 the road sign maintenance device provides a recommendation based on the impending risk of failing to spot the road sign.

Figure 23:
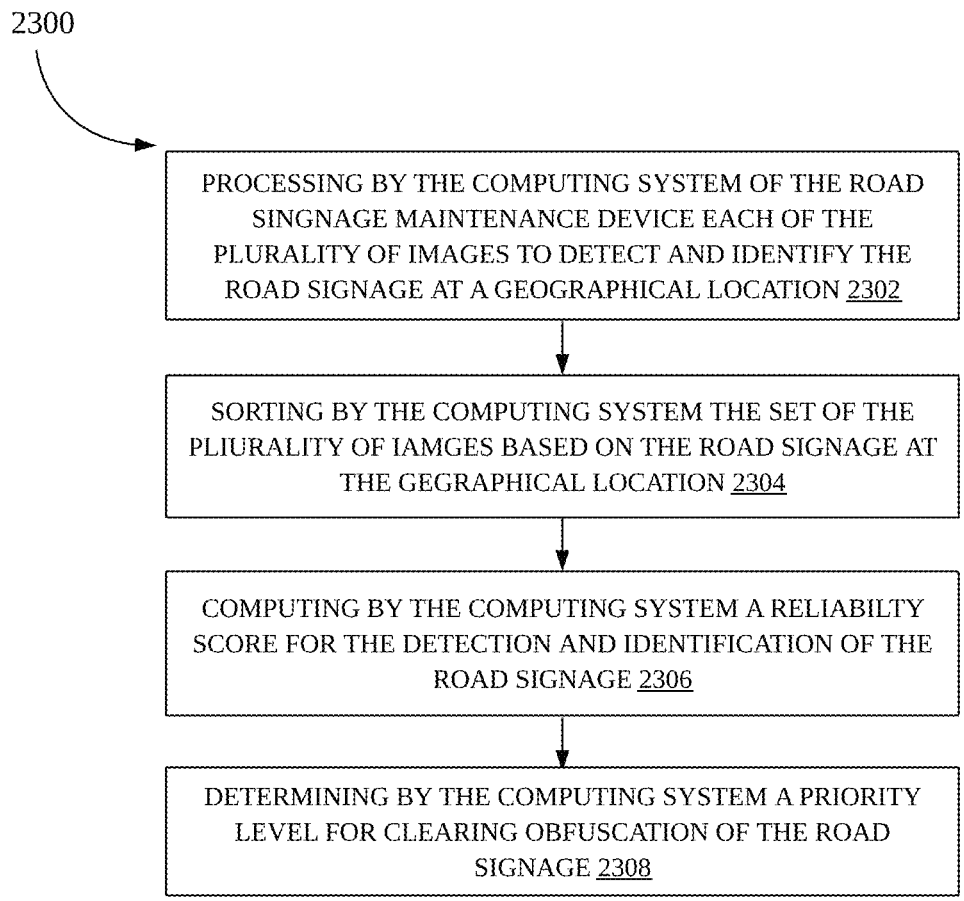
FIG. 23 is a flowchart of an exemplary method for detecting and managing obfuscation of a road sign, in accordance with an embodiment.

FIG. 23 is a flow chart illustrating an exemplary method 2300 for detecting and managing obfuscation of a road sign, in accordance with an embodiment. A method for detecting and managing obfuscation of a road sign begins at step 2302.

At step 2302, the road sign maintenance device processes each of the plurality of images to detect and identify the road sign at the geographic sector location. The processing includes at least one of performing image processing and applying an artificial intelligence model.

At step 2304 the road sign maintenance device sorts the set of the plurality of images based on the road sign at the geographic location.

At step 2306 the road sign maintenance device computes a reliability score for the detection and identification of the road sign. The recommendation provided by the road sign maintenance device is based on the reliability score.

At step 2308, the road sign maintenance device determines a priority level for clearing obfuscation of the road sign based on at least one of the impending risk of failing to spot the road sign, the current extent of obfuscation of the road sign, the road sign, the time, or the geographical location.

It may be appreciated by a person skilled in the art, that virtually any additional steps may be added to the method for detecting and managing obfuscation of a road sign 2200 and 2300. Additional steps may include, but not limited to, additional data gathering, sending messages to other devices, and accessing additional resources.

It may be appreciated by a person with ordinary skill in the art, in light of and in accordance with the teachings of the present disclosure, that one or more steps in the method for detecting and managing obfuscation of a road sign 2200 and 2300 may be added, removed, or rearranged. In other embodiments of the present disclosure, the order of steps of the method for detecting and managing obfuscation of a road sign 2200 and 2300 may occur in any order.

Those skilled in the art will readily recognize, in light of and in accordance with the teachings of the present disclosure, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the disclosure may be embodied.

Figure 24:
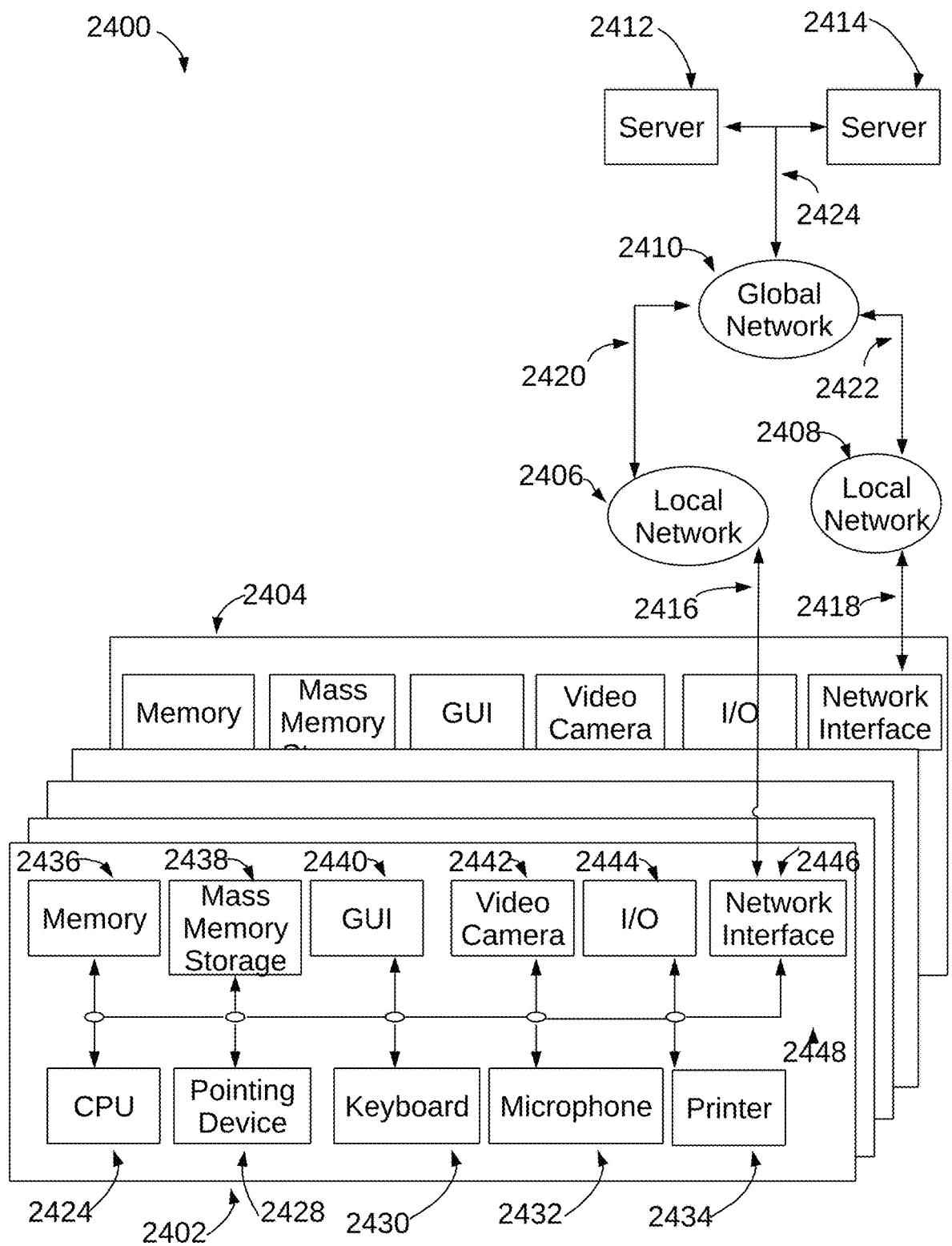
FIG. 24 is a block diagram depicting an exemplary client/server system which may be used by an exemplary web-enabled/networked embodiment.

FIG. 24 is a block diagram depicting an exemplary client/server system which may be used by an exemplary web-enabled/networked embodiment of the present disclosure.

A communication system 2400 includes a multiplicity of clients with a sampling of clients denoted as a client 2402 and a client 2404, a multiplicity of local networks with a sampling of networks denoted as a local network 2406 and a local network 2408, a global network 2410 and a multiplicity of servers with a sampling of servers denoted as a server 2412 and a server 2414.

Client 2402 may communicate bi-directionally with local network 2406 via a communication channel 2416. Client 2404 may communicate bi-directionally with local network 2408 via a communication channel 2418. Local network 2406 may communicate bi-directionally with global network 2410 via a communication channel 2420. Local network 2408 may communicate bi-directionally with global network 2410 via a communication channel 2422. Global network 2410 may communicate bi-directionally with server 2412 and server 2414 via a communication channel 2424. Server 2412 and server 2414 may communicate bi-directionally with each other via communication channel 2424. Furthermore, clients 2402, 2404, local networks 2406, 2408, global network 2410 and servers 2412, 2414 may each communicate bi-directionally with each other.

In one embodiment, global network 2410 may operate as the Internet. It will be understood by those skilled in the art that communication system 2400 may take many different forms. Non-limiting examples of forms for communication system 2400 include local area networks (LANs), wide area networks (WANs), wired telephone networks, wireless networks, or any other network supporting data communication between respective entities.

Clients 2402 and 2404 may take many different forms. Non-limiting examples of clients 2402 and 2404 include personal computers, personal digital assistants (PDAs), cellular phones and smartphones.

Client 2402 includes a CPU 2426, a pointing device 2428, a keyboard 2430, a microphone 2432, a printer 2434, a memory 2436, a mass memory storage 2438, a GUI 2440, a video camera 2442, an input/output interface 2444, and a network interface 2446.

CPU 2426, pointing device 2428, keyboard 2430, microphone 2432, printer 2434, memory 2436, mass memory storage 2438, GUI 2440, video camera 2442, input/output interface 2444 and network interface 2446 may communicate in a unidirectional manner or a bi-directional manner with each other via a communication channel 2448. Communication channel 2448 may be configured as a single communication channel or a multiplicity of communication channels.

CPU 2426 may be comprised of a single processor or multiple processors. CPU 2426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 2436 is used typically to transfer data and instructions to CPU 2426 in a bi-directional manner. Memory 2436, as discussed previously, may include any suitable computer-readable media, intended for data storage, such as those described above excluding any wired or wireless transmissions unless specifically noted. Mass memory storage 2438 may also be coupled bi-directionally to CPU 2426 and provides additional data storage capacity and may include any of the computer-readable media described above. Mass memory storage 2438 may be used to store programs, data and the like and is typically a secondary storage medium such as a hard disk. It will be appreciated that the information retained within mass memory storage 2438, may, in appropriate cases, be incorporated in standard fashion as part of memory 2436 as virtual memory.

CPU 2426 may be coupled to GUI 2440. GUI 2440 enables a user to view the operation of computer operating system and software. CPU 2426 may be coupled to pointing device 2428. Non-limiting examples of pointing device 2428 include computer mouse, trackball and touchpad. Pointing device 2428 enables a user with the capability to maneuver a computer cursor about the viewing area of GUI 2440 and select areas or features in the viewing area of GUI 2440. CPU 2426 may be coupled to keyboard 2430. Keyboard 2430 enables a user with the capability to input alphanumeric textual information to CPU 2426. CPU 2426 may be coupled to microphone 2432. Microphone 2432 enables audio produced by a user to be recorded, processed and communicated by CPU 2426. CPU 2426 may be connected to printer 2434. Printer 2434 enables a user with the capability to print information to a sheet of paper. CPU 2426 may be connected to video camera 2442. Video camera 2442 enables video produced or captured by user to be recorded, processed and communicated by CPU 2426.

CPU 2426 may also be coupled to input/output interface 2444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 2426 optionally may be coupled to network interface 2446 which enables communication with an external device such as a database or a computer or telecommunications or internet network using an external connection shown generally as communication channel 2416, which may be implemented as a hardwired or wireless communications link using suitable conventional technologies. With such a connection, CPU 2426 might receive information from the network, or might output information to a network in the course of performing the method steps described in the teachings of the present disclosure.

Having fully described at least one embodiment of the present disclosure, other equivalent or alternative methods of implementing the design for analyzing data displayed on ventilators using designated computer programs according to the present disclosure will be apparent to those skilled in the art. Various aspects of the disclosure have been described above by way of illustration, and the specific embodiments disclosed are not intended to limit the disclosure to the particular forms disclosed. The particular implementation for detecting and managing obfuscation of road signs using designated computer programs may vary depending upon the particular context or application. By way of example, and not limitation, the system for detecting and managing obfuscation of road signs using designated computer programs described in the foregoing were principally directed to analyzing images of road signs obtained from image capturing devices using a designated computer program, and using the analyzed data to provide alerts and make recommendations for managing the obfuscation of road signs; however, similar techniques may instead be applied to other application areas including, but not limited to, marketing applications for advertising and commerce to understand if the view of a particular billboard or a particular product is complete/partial, and security and video surveillance applications that locate a target on a video stream, autopilot drones to search for a target, and/or autopilot drones to follow a target. Such implementations of the present disclosure are contemplated as within the scope of the present disclosure. The disclosure is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Various embodiments of the present disclosure may facilitate safety of the driver associated with a vehicle on the road, thereby creating a safe city, especially when the road signs (or any object on the road, such as traffic lights) are hardly visible or hidden due to the growth of the surrounding vegetation. Visibility of signs on streets and highways is vital for safety, since in addition to regulating traffic, it informs the driver of the condition of the roads. The disclosed method and system may facilitate proactive action to be taken by concerned authorities to clear obfuscation of the road signs. Further, voluntary reports associated with image data from fleet vehicles and consumer vehicles may aid in precise and accurate detection and management of obfuscation of the road signs by the system in real time and near real time.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The following claims are hereby incorporated into the detailed description, with each claim standing on its own as a separate embodiment.

What is claimed is:

1. A method for detecting and managing obfuscation of a road sign, comprising:
   receiving, by a road sign maintenance device, a plurality of images from a plurality of vehicles over a period of time, wherein each of the plurality of images is captured by an image capturing device mounted on a vehicle from among the plurality of vehicle and is associated with a corresponding geographic location of the vehicle, and wherein a set of images from the plurality of images comprises a road sign in a geographic location that is at least partially obfuscated;
   determining, by the road sign maintenance device, an extent of obfuscation of the road sign in each of the set of images, wherein a current extent of obfuscation of the road sign is the extent of obfuscation of the road sign in most recent of the set of images;

performing, by the road sign maintenance device, a time-series analysis of the extent of obfuscation of the road sign in each of the set of images to determine a rate at which the extent of obfuscation of the road sign is increasing;

determining, by the road sign maintenance device, an impending risk of failing to spot the road sign, from an appropriate distance by the vehicle, based on the at least one of the current extent of obfuscation of the road sign and the rate at which the extent of obfuscation of the road sign is increasing; and providing, by the road sign maintenance device, a recommendation based on the impending risk of failing to spot the road sign.

2. The method of claim 1, further comprising:

processing, by the road sign maintenance device, each of the plurality of images to detect and identify the road sign at the geographic location, wherein the processing comprises at least one of performing image processing and applying an artificial intelligence model;

sorting, by the road sign maintenance device, the set of the plurality of images based on the road sign at the geographic location.

3. The method of claim 2, further comprising:

computing, by the road sign maintenance device, a reliability score for the detection and identification of the road sign, wherein the recommendation is based on the reliability score.

4. The method of claim 1, wherein determining the impending risk of failing to spot the road sign further comprises one of:

determining, by the road sign maintenance device, whether the current extent of obfuscation of the road sign is more than a pre-determined threshold; and forecasting, by the road sign maintenance device, a time when the current extent of obfuscation of the road sign is more than the pre-determined threshold based on the rate at which the extent of obfuscation of the road sign is increasing.

5. The method of claim 4, further comprising:

determining, by the road sign maintenance device, a priority level for clearing obfuscation of the road sign based on at least one of the impending risk of failing to spot the road sign, the current extent of obfuscation of the road sign, the road sign, the time, or the geographical location.

6. The method of claim 5, wherein the recommendation comprises at least one of:

an alert to a driver of a vehicle while approaching the geographic location, about the road sign;

an alert to an obfuscation clearing agent, about the road sign, the geographic location, the current extent of obfuscation, and the time; or a prioritized schedule to the obfuscation clearing agent, wherein the prioritized schedule is generated based on the geographical location and the priority level, and wherein the prioritized schedule comprises information on each of one or more obfuscated road signs, the geographic location of each of the one or more obfuscated road signs, a priority level of each of one or more obfuscated road signs.

7. The method of claim 1, wherein the image capturing device mounted on the vehicle captures at least some of the set of images when the vehicle makes one or more passes about the road sign over the period of time, and wherein the at least some of the set of images are from: one or more angles, one or more distance, and one or more time of the day.

8. A system for detecting and managing obfuscation of a road sign, comprising:

at least one memory configured to store computer program code instructions; and at least one processor configured to execute the computer program code instructions to:

receive a plurality of images from a plurality of vehicles over a period of time, wherein each of the plurality of images is captured by an image capturing device mounted on a vehicle from among the plurality of vehicle and is associated with a corresponding geographic location of the vehicle, and wherein a set of images from the plurality of images comprises a road sign in a geographic location that is at least partially obfuscated;

determine an extent of obfuscation of the road sign in each of the set of images, wherein a current extent of obfuscation of the road sign is the extent of obfuscation of the road sign in most recent of the set of images;

perform a time-series analysis of the extent of obfuscation of the road sign in each of the set of images to determine a rate at which the extent of obfuscation of the road sign is increasing;

determine an impending risk of failing to spot the road sign, from an appropriate distance by the vehicle, based on the at least one of the current extent of obfuscation of the road sign and the rate at which the extent of obfuscation of the road sign is increasing; and provide a recommendation based on the impending risk of failing to spot the road sign.

9. The system of claim 8, wherein the at least one processor is further configured to:

process each of the plurality of images to detect and identify the road sign at the geographic location, wherein the processing comprises at least one of performing image processing and applying an artificial intelligence model;

sort the set of the plurality of images based on the road sign at the geographic location.

10. The system of claim 9, wherein the at least one processor is further configured to compute a reliability score for the detection and identification of the road sign, wherein the recommendation is based on the reliability score.

11. The system of claim 8, wherein to determine the impending risk of failing to spot the road sign, the at least one processor is further configured to:

determine whether the current extent of obfuscation of the road sign is more than a pre-determined threshold; and forecast a time when the current extent of obfuscation of the road sign is more than the pre-determined threshold based on the rate at which the extent of obfuscation of the road sign is increasing.

12. The system of claim 11, the at least one processor is further configured to determine a priority level for clearing obfuscation of the road sign based on at least one of the impending risk of failing to spot the road sign, the current extent of obfuscation of the road sign, the road sign, the time, or the geographical location.

13. The system of claim 12, wherein the recommendation comprises at least one of:

an alert to a driver of a vehicle while approaching the geographic location, about the road sign;

an alert to an obfuscation clearing agent, about the road sign, the geographic location, the current extent of obfuscation, and the time; or a prioritized schedule to the obfuscation clearing agent, wherein the prioritized schedule is generated based on the geographical location and the priority level, and wherein the prioritized schedule comprises information on each of one or more obfuscated road signs, the geographic location of each of the one or more obfuscated road signs, a priority level of each of one or more obfuscated road signs.

14. The system of claim 8, wherein the image capturing device mounted on the vehicle is configured to capture at least some of the set of images when the vehicle makes one or more passes about the road sign over the period of time, and wherein the at least some of the set of images are from: one or more angles, one or more distance, and one or more time of the day.

15. A computer program product comprising at least one non-transitory computer readable storage medium having computer-executable program code portions stored therein, the computer-executable program code portions comprising program code instructions configured to:

receive a plurality of images from a plurality of vehicles over a period of time, wherein each of the plurality of images is captured by an image capturing device mounted on a vehicle from among the plurality of vehicle and is associated with a corresponding geographic location of the vehicle, and wherein a set of images from the plurality of images comprises a road sign in a geographic location that is at least partially obfuscated;

determine an extent of obfuscation of the road sign in each of the set of images, wherein a current extent of obfuscation of the road sign is the extent of obfuscation of the road sign in most recent of the set of images;

perform a time-series analysis of the extent of obfuscation of the road sign in each of the set of images to determine a rate at which the extent of obfuscation of the road sign is increasing;

determine an impending risk of failing to spot the road sign, from an appropriate distance by the vehicle, based on the at least one of the current extent of obfuscation of the road sign and the rate at which the extent of obfuscation of the road sign is increasing; and provide a recommendation based on the impending risk of failing to spot the road sign.

16. The computer program product of claim 15, wherein the program code instructions further configured to:

process each of the plurality of images to detect and identify the road sign at the geographic location, wherein the processing comprises at least one of performing image processing and applying an artificial intelligence model;

sort the set of the plurality of images based on the road sign at the geographic location.

17. The computer program product of claim 16, wherein the program code instructions are further configured to compute a reliability score for the detection and identification of the road sign, wherein the recommendation is based on the reliability score.

18. The computer program product of claim 15, wherein to determine the impending risk of failing to spot the road sign, the program code instructions further configured to:

determine whether the current extent of obfuscation of the road sign is more than a pre-determined threshold; and forecast a time when the current extent of obfuscation of the road sign is more than the pre-determined threshold based on the rate at which the extent of obfuscation of the road sign is increasing.

19. The computer program product of claim 18, the program code instructions further configured to determine a priority level for clearing obfuscation of the road sign based on at least one of the impending risk of failing to spot the road sign, the current extent of obfuscation of the road sign, the road sign, the time, or the geographical location.

20. The computer program product of claim 19, wherein the recommendation comprises at least one of:

an alert to a driver of a vehicle while approaching the geographic location, about the road sign;

an alert to an obfuscation clearing agent, about the road sign, the geographic location, the current extent of obfuscation, and the time; or a prioritized schedule to the obfuscation clearing agent, wherein the prioritized schedule is generated based on the geographical location and the priority level, and wherein the prioritized schedule comprises information on each of one or more obfuscated road signs, the geographic location of each of the one or more obfuscated road signs, a priority level of each of one or more obfuscated road signs.

* * * * *